(12) United States Patent
Bakalash et al.

(10) Patent No.: US 8,497,865 B2
(45) Date of Patent: Jul. 30, 2013

(54) PARALLEL GRAPHICS SYSTEM EMPLOYING MULTIPLE GRAPHICS PROCESSING PIPELINES WITH MULTIPLE GRAPHICS PROCESSING UNITS (GPUS) AND SUPPORTING AN OBJECT DIVISION MODE OF PARALLEL GRAPHICS PROCESSING USING PROGRAMMABLE PIXEL OR VERTEX PROCESSING RESOURCES PROVIDED WITH THE GPUS

(75) Inventors: Reuven Bakalash, Shdema (IL); Yaniv Leviathan, Savyon (IL)

(73) Assignee: Lucid Information Technology, Ltd., Kfar Netter (IL)

( * ) Notice: Subject to any disclaimer, the term of this patent is extended or adjusted under 35 U.S.C. 154(b) by 1404 days.

(21) Appl. No.: 11/648,160

(22) Filed: Dec. 31, 2006

(65) Prior Publication Data

US 2008/0158236 A1 Jul. 3, 2008

(51) Int. Cl.
- *G06T 1/00* (2006.01)
- *G06T 1/20* (2006.01)
- *G09G 5/36* (2006.01)
- *G06T 15/00* (2011.01)

(52) U.S. Cl.
CPC .............. *G06T 1/20* (2013.01); *G06T 15/005* (2013.01); *G09G 5/363* (2013.01)
USPC ........... 345/501; 345/502; 345/503; 345/504; 345/505; 345/506; 345/519; 345/522

(58) Field of Classification Search
CPC .......... G06T 1/20; G06T 15/005; G09G 5/363
USPC ................. 345/501–505, 519–522
See application file for complete search history.

(56) References Cited

U.S. PATENT DOCUMENTS

| | | | |
|---|---|---|---|
| 5,475,856 | A | 12/1995 | Kogge |
| 5,535,410 | A | 7/1996 | Watanabe et al. |
| 5,687,357 | A | 11/1997 | Priem |
| 5,740,464 | A | 4/1998 | Priem et al. |
| 5,745,762 | A | 4/1998 | Celi, Jr. et al. |

(Continued)

FOREIGN PATENT DOCUMENTS

| | | |
|---|---|---|
| EP | 04 79 9376 | 10/2008 |
| WO | WO 2004/070652 A2 | 8/2004 |

(Continued)

OTHER PUBLICATIONS

Powerpoint presentation entitled, "Go Multiple" by Dennis Yang, Conference Platform, 2007, 11 pages.

(Continued)

*Primary Examiner* — Jin-Cheng Wang
(74) *Attorney, Agent, or Firm* — Eitan, Mehulal & Sadot

(57) ABSTRACT

A multiple graphics processing unit (GPU) based parallel graphics system comprising multiple graphics processing pipelines with multiple GPUs supporting a parallel graphics rendering process having an object division mode of operation. Each GPU comprises video memory, a geometry processing subsystem and a pixel processing subsystem. According to the principles of the present invention, pixel (color and z depth) data buffered in the video memory of each GPU is communicated to the video memory of a primary GPU, and the video memory and the pixel processing subsystem in the primary GPU are used to carry out the image recomposition process, without the need for dedicated or specialized apparatus.

8 Claims, 24 Drawing Sheets

U.S. PATENT DOCUMENTS

| | | |
|---|---|---|
| 5,754,866 A | 5/1998 | Priem |
| 5,757,385 A | 5/1998 | Narayanaswami et al. |
| 5,758,182 A | 5/1998 | Rosenthal et al. |
| 5,794,016 A | 8/1998 | Kelleher |
| 5,841,444 A | 11/1998 | Mun et al. |
| 5,909,595 A | 6/1999 | Rosenthal et al. |
| 6,118,462 A | 9/2000 | Margulis |
| 6,169,553 B1 | 1/2001 | Fuller et al. |
| 6,181,352 B1 | 1/2001 | Kirk et al. |
| 6,184,908 B1 | 2/2001 | Chan et al. |
| 6,188,412 B1 | 2/2001 | Morein |
| 6,191,800 B1 | 2/2001 | Arenburg et al. |
| 6,201,545 B1 | 3/2001 | Wong et al. |
| 6,212,261 B1 | 4/2001 | Meubus et al. |
| 6,212,617 B1 | 4/2001 | Hardwick |
| 6,259,460 B1 | 7/2001 | Gossett et al. |
| 6,288,418 B1 | 9/2001 | Reed et al. |
| 6,292,200 B1 | 9/2001 | Bowen et al. |
| 6,333,744 B1 | 12/2001 | Kirk et al. |
| 6,337,686 B2 | 1/2002 | Wong et al. |
| 6,352,479 B1 | 3/2002 | Sparks, II |
| 6,415,345 B1 | 7/2002 | Wu et al. |
| 6,442,656 B1 | 8/2002 | Alasti et al. |
| 6,462,737 B2 | 10/2002 | Lindholm et al. |
| 6,473,086 B1 | 10/2002 | Morein et al. |
| 6,473,089 B1 | 10/2002 | Wei et al. |
| 6,477,687 B1 | 11/2002 | Thomas |
| 6,492,987 B1 | 12/2002 | Morein |
| 6,496,187 B1 | 12/2002 | Deering et al. |
| 6,496,404 B1 | 12/2002 | Fiedler et al. |
| 6,502,173 B1 | 12/2002 | Aleksic et al. |
| 6,529,198 B1 | 3/2003 | Miyauchi |
| 6,532,013 B1 | 3/2003 | Papakipos et al. |
| 6,532,525 B1 | 3/2003 | Aleksic et al. |
| 6,535,209 B1 | 3/2003 | Abdalla et al. |
| 6,542,971 B1 | 4/2003 | Reed |
| 6,557,065 B1 | 4/2003 | Peleg et al. |
| 6,577,309 B2 | 6/2003 | Lindholm et al. |
| 6,577,320 B1 | 6/2003 | Kirk |
| 6,578,068 B1 | 6/2003 | Bowman-Amuah |
| 6,593,923 B1 | 7/2003 | Donovan et al. |
| 6,633,296 B1 | 10/2003 | Laksono et al. |
| 6,636,212 B1 | 10/2003 | Zhu |
| 6,636,215 B1 | 10/2003 | Greene |
| 6,646,639 B1 | 11/2003 | Greene et al. |
| 6,650,330 B2 | 11/2003 | Lindholm et al. |
| 6,650,331 B2 | 11/2003 | Lindholm et al. |
| 6,657,635 B1 | 12/2003 | Hutchins et al. |
| 6,662,257 B1 | 12/2003 | Caruk et al. |
| 6,664,960 B2 | 12/2003 | Goel et al. |
| 6,664,963 B1 | 12/2003 | Zatz |
| 6,670,958 B1 | 12/2003 | Aleksic et al. |
| 6,677,953 B1 | 1/2004 | Twardowski et al. |
| 6,683,614 B2 | 1/2004 | Walls et al. |
| 6,690,372 B2 | 2/2004 | Donovan et al. |
| 6,691,180 B2 | 2/2004 | Priem et al. |
| 6,700,583 B2 | 3/2004 | Fowler et al. |
| 6,704,025 B1 | 3/2004 | Bastos et al. |
| 6,724,394 B1 | 4/2004 | Zatz et al. |
| 6,725,457 B1 | 4/2004 | Priem et al. |
| 6,728,820 B1 | 4/2004 | Brian et al. |
| 6,731,298 B1 | 5/2004 | Moreton et al. |
| 6,734,861 B1 | 5/2004 | Van Dyke et al. |
| 6,734,874 B2 | 5/2004 | Lindholm et al. |
| 6,741,243 B2 | 5/2004 | Lewis et al. |
| 6,744,433 B1 | 6/2004 | Bastos et al. |
| 6,753,878 B1 | 6/2004 | Heirich et al. |
| 6,774,895 B1 | 8/2004 | Papakipos et al. |
| 6,778,176 B2 | 8/2004 | Lindholm et al. |
| 6,778,177 B1 | 8/2004 | Furtner |
| 6,778,181 B1 | 8/2004 | Kilgariff et al. |
| 6,778,189 B1 | 8/2004 | Kilgard |
| 6,779,069 B1 | 8/2004 | Treichler et al. |
| 6,789,154 B1 | 9/2004 | Lee et al. |
| 6,797,998 B2 | 9/2004 | Dewey et al. |
| 6,801,202 B2 | 10/2004 | Nelson et al. |
| 6,812,927 B1 | 11/2004 | Cutler et al. |
| 6,825,843 B2 | 11/2004 | Allen et al. |
| 6,828,980 B1 | 12/2004 | Moreton et al. |
| 6,828,987 B2 | 12/2004 | Swan |
| 6,831,652 B1 | 12/2004 | Orr |
| 6,842,180 B1 | 1/2005 | Maiyuran et al. |
| 6,844,879 B2 | 1/2005 | Miyaushi |
| 6,856,320 B1 | 2/2005 | Rubinstein et al. |
| 6,864,893 B2 | 3/2005 | Zatz |
| 6,864,984 B2 | 3/2005 | Naya et al. |
| 6,870,540 B1 | 3/2005 | Lindholm et al. |
| 6,876,362 B1 | 4/2005 | Newhall, Jr. et al. |
| 6,885,376 B2 | 4/2005 | Tang-Petersen et al. |
| 6,894,687 B1 | 5/2005 | Kilgard et al. |
| 6,894,689 B1 | 5/2005 | Greene et al. |
| 6,900,810 B1 | 5/2005 | Moreton et al. |
| 6,938,176 B1 | 8/2005 | Alben et al. |
| 6,940,515 B1 | 9/2005 | Moreton et al. |
| 6,947,047 B1 | 9/2005 | Moy et al. |
| 6,947,865 B1 | 9/2005 | Mimberg et al. |
| 6,952,206 B1 | 10/2005 | Craighead |
| 6,959,110 B1 | 10/2005 | Danskin et al. |
| 6,961,057 B1 | 11/2005 | Van Dyke et al. |
| 6,975,319 B1 | 12/2005 | Donovan et al. |
| 6,980,209 B1 | 12/2005 | Donham et al. |
| 6,982,718 B2 | 1/2006 | Kilgard et al. |
| 6,985,152 B2 | 1/2006 | Rubinstein et al. |
| 6,989,840 B1 | 1/2006 | Everitt et al. |
| 6,992,667 B2 | 1/2006 | Lindholm et al. |
| 6,995,767 B1 | 2/2006 | Donovan et al. |
| 6,999,076 B2 | 2/2006 | Morein |
| 7,002,588 B1 | 2/2006 | Lindholm et al. |
| 7,015,915 B1 * | 3/2006 | Diard ............................ 345/522 |
| 7,023,437 B1 | 4/2006 | Voorhies et al. |
| 7,027,972 B1 | 4/2006 | Lee |
| 7,038,678 B2 | 5/2006 | Bunnell |
| 7,038,685 B1 | 5/2006 | Lindholm |
| 7,038,692 B1 | 5/2006 | Priem et al. |
| 7,051,139 B2 | 5/2006 | Peleg et al. |
| 7,053,901 B2 | 5/2006 | Huang et al. |
| 7,064,763 B2 | 6/2006 | Lindholm et al. |
| 7,068,272 B1 | 6/2006 | Voorhies et al. |
| 7,068,278 B1 | 6/2006 | Williams et al. |
| 7,075,541 B2 * | 7/2006 | Diard ............................ 345/505 |
| 7,080,194 B1 | 7/2006 | Van Dyke |
| 7,081,895 B2 | 7/2006 | Papakipos et al. |
| 7,091,971 B2 | 8/2006 | Morein |
| 7,095,414 B2 | 8/2006 | Lindholm et al. |
| 7,098,922 B1 | 8/2006 | Bastos et al. |
| 7,119,808 B2 | 10/2006 | Goncalez et al. |
| 7,120,816 B2 | 10/2006 | Williams et al. |
| 7,123,266 B2 | 10/2006 | Wei et al. |
| 7,129,909 B1 | 10/2006 | Dong et al. |
| 7,130,316 B2 | 10/2006 | Kovacevic |
| 7,142,215 B1 | 11/2006 | Papakipos et al. |
| 7,145,565 B2 | 12/2006 | Everitt et al. |
| 7,170,513 B1 | 1/2007 | Voorhies et al. |
| 7,170,515 B1 | 1/2007 | Zhu |
| 7,224,359 B1 | 5/2007 | Papakipos et al. |
| 7,248,261 B1 | 7/2007 | Hakura |
| 7,289,125 B2 | 10/2007 | Diard et al. |
| 7,324,111 B2 | 1/2008 | Diamond |
| 7,324,547 B1 | 1/2008 | Alfieri et al. |
| 7,325,086 B2 | 1/2008 | Kong et al. |
| 7,372,465 B1 | 5/2008 | Tamasi et al. |
| 7,477,256 B1 | 1/2009 | Johnson |
| 2001/0029556 A1 | 10/2001 | Priem et al. |
| 2002/0015055 A1 | 2/2002 | Foran |
| 2002/0059302 A1 | 5/2002 | Ebihara |
| 2002/0085007 A1 | 7/2002 | Nelson et al. |
| 2002/0118308 A1 | 8/2002 | Dujmenovic |
| 2002/0145612 A1 | 10/2002 | Blythe et al. |
| 2002/0180740 A1 | 12/2002 | Lindholm et al. |
| 2002/0196259 A1 | 12/2002 | Lindholm et al. |
| 2003/0020720 A1 | 1/2003 | Lindholm et al. |
| 2003/0034975 A1 | 2/2003 | Lindholm et al. |
| 2003/0038808 A1 | 2/2003 | Lindholm et al. |
| 2003/0080959 A1 | 5/2003 | Morein |
| 2003/0103054 A1 | 6/2003 | Montrym et al. |
| 2003/0112245 A1 | 6/2003 | Lindholm et al. |
| 2003/0112246 A1 | 6/2003 | Lindholm et al. |

| | | |
|---|---|---|
| 2003/0117971 A1 | 6/2003 | Aubury |
| 2003/0128197 A1 | 7/2003 | Turner et al. |
| 2003/0151606 A1 | 8/2003 | Morein |
| 2003/0164832 A1 | 9/2003 | Alcorn |
| 2003/0164834 A1 | 9/2003 | Lefebvre et al. |
| 2003/0171907 A1 | 9/2003 | Gal-On et al. |
| 2003/0179220 A1 | 9/2003 | Dietrich, Jr. et al. |
| 2003/0188075 A1 | 10/2003 | Peleh et al. |
| 2003/0189565 A1 | 10/2003 | Lindholm et al. |
| 2003/0212735 A1 | 11/2003 | Hicok et al. |
| 2004/0012600 A1 | 1/2004 | Deering et al. |
| 2004/0036159 A1 | 2/2004 | Bruno |
| 2004/0066384 A1* | 4/2004 | Ohba .................. 345/419 |
| 2004/0153778 A1 | 8/2004 | Cheng |
| 2004/0169651 A1 | 9/2004 | Everitt et al. |
| 2004/0179019 A1 | 9/2004 | Sabella et al. |
| 2004/0196289 A1 | 10/2004 | Langendorf et al. |
| 2004/0207618 A1 | 10/2004 | Williams et al. |
| 2004/0210788 A1 | 10/2004 | Williams et al. |
| 2004/0223003 A1 | 11/2004 | Heirich et al. |
| 2005/0041031 A1 | 2/2005 | Diard |
| 2005/0081115 A1 | 4/2005 | Cheng et al. |
| 2005/0122330 A1 | 6/2005 | Boyd et al. |
| 2005/0162437 A1 | 7/2005 | Morein et al. |
| 2005/0166207 A1 | 7/2005 | Baba et al. |
| 2005/0190189 A1 | 9/2005 | Chefd'hotel et al. |
| 2005/0190190 A1* | 9/2005 | Diard et al. .................. 345/502 |
| 2005/0195186 A1 | 9/2005 | Mitchell et al. |
| 2005/0195187 A1 | 9/2005 | Seiler et al. |
| 2005/0206646 A1 | 9/2005 | Alcorn |
| 2005/0223124 A1 | 10/2005 | Reed |
| 2005/0225558 A1 | 10/2005 | Morein et al. |
| 2005/0237327 A1 | 10/2005 | Rubinstein et al. |
| 2005/0237329 A1 | 10/2005 | Rubinstein et al. |
| 2005/0243096 A1 | 11/2005 | Possley et al. |
| 2005/0243215 A1 | 11/2005 | Doswald et al. |
| 2005/0259103 A1 | 11/2005 | Kilgard et al. |
| 2005/0265064 A1 | 12/2005 | Ku et al. |
| 2005/0275760 A1 | 12/2005 | Gritz et al. |
| 2006/0005178 A1 | 1/2006 | Kilgard et al. |
| 2006/0028478 A1 | 2/2006 | Rubinstein et al. |
| 2006/0055695 A1 | 3/2006 | Abdalla et al. |
| 2006/0059494 A1 | 3/2006 | Wexler et al. |
| 2006/0101218 A1 | 5/2006 | Reed |
| 2006/0114260 A1 | 6/2006 | Diard |
| 2006/0119607 A1 | 6/2006 | Lindholm et al. |
| 2006/0120376 A1 | 6/2006 | Duncan et al. |
| 2006/0123142 A1 | 6/2006 | Duncan et al. |
| 2006/0156399 A1 | 7/2006 | Parmar et al. |
| 2006/0202941 A1 | 9/2006 | Morein et al. |
| 2006/0208960 A1 | 9/2006 | Glen |
| 2006/0221086 A1 | 10/2006 | Diard |
| 2006/0221087 A1 | 10/2006 | Diard |
| 2006/0225061 A1 | 10/2006 | Ludwig et al. |
| 2006/0248241 A1 | 11/2006 | Danilak |
| 2006/0267987 A1 | 11/2006 | Litchmanov |
| 2006/0268005 A1 | 11/2006 | Hutchins et al. |
| 2006/0271713 A1 | 11/2006 | Xie et al. |
| 2006/0274073 A1 | 12/2006 | Johnson et al. |
| 2006/0282604 A1 | 12/2006 | Temkine et al. |
| 2006/0290700 A1 | 12/2006 | Gonzalez et al. |
| 2007/0159488 A1 | 7/2007 | Danskin et al. |
| 2007/0195099 A1 | 8/2007 | Diard et al. |
| 2008/0007559 A1 | 1/2008 | Kalaiah et al. |
| 2008/0143731 A1 | 6/2008 | Cheng et al. |

FOREIGN PATENT DOCUMENTS

| | | |
|---|---|---|
| WO | PCT/IL04/001069 | 6/2005 |
| WO | PCT/IB06/01529 | 12/2007 |
| WO | PCT/US07/26466 | 7/2008 |
| WO | PCT/IB07/03464 | 9/2008 |

OTHER PUBLICATIONS

Scientific publication entitled, "Chromium; A Stream-Processing Framework for Interactive Rendering on Clusters" from Stanford University, Lawrence Livermore National Laboratory, and IBM T.J. Watson Research Center, 2007, 10 pages.

Scientific publication entitled "Hybrid Sort-First and Sort-Last Parallel Rendering with a Cluster of PCs" by Rudrajit Samanta et al., Princeton University, 12 pages, c. 2000.

Publication by TW Crockett entitled, "An Introduction to Parallel Rendering", in Parallel Computing, 1997, Elsevier Science, 29 Pages.

Silicon Graphics, Inc. pdf. document entitled "OpenGL Multipipe™ SDK White Paper", 2002,2003, pp. 1-32.

Silicon Graphics, Inc. online document entitled "Additional Information for: OpenGL Multipipe™ SDK White Paper (IRIX 6.5)", published Feb. 1, 2003, 2 pages.

Technical publication by Li et al entiteled "ParVox—A Parallel Splatting Volume Rendering System for Distributed Visualization," Oct. 1997, 7 Pages.

Department of Computer Science, University of North Carolina publication by Molnar et al. entitled, "PixelFlow: High-Speed Rendering Using Image Composition," 1992, 10 Pages.

* cited by examiner

PC based computing system employing a multiple GPU graphics subsystem supporting time and image division modes of parallel graphics rendering

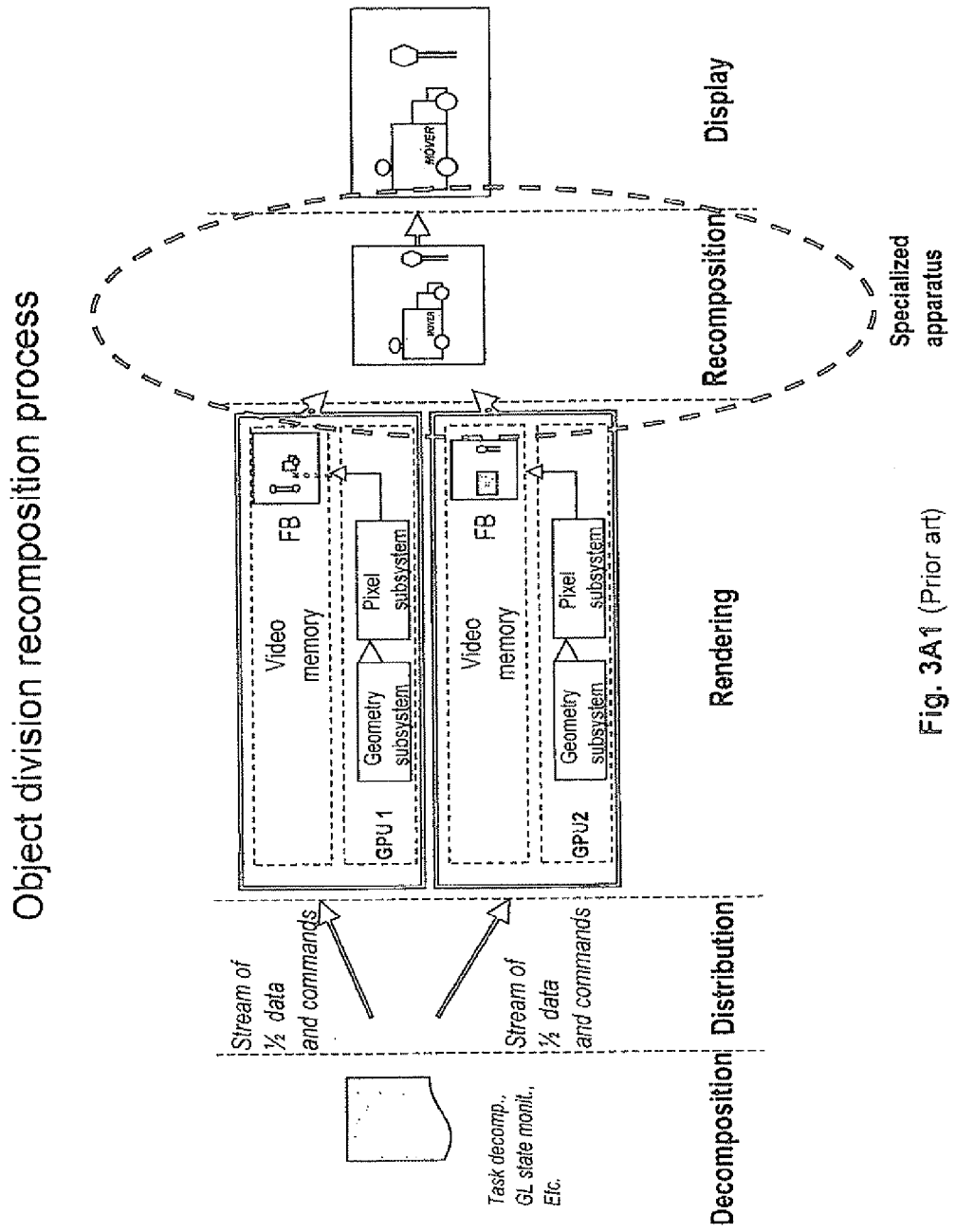

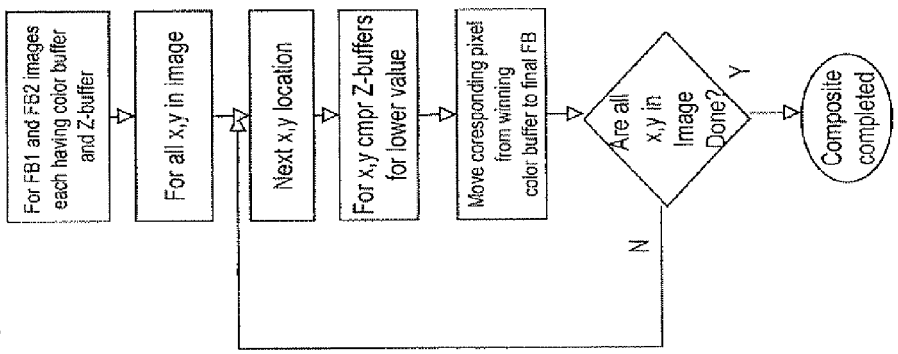
Fig. 3A2 (Prior art)

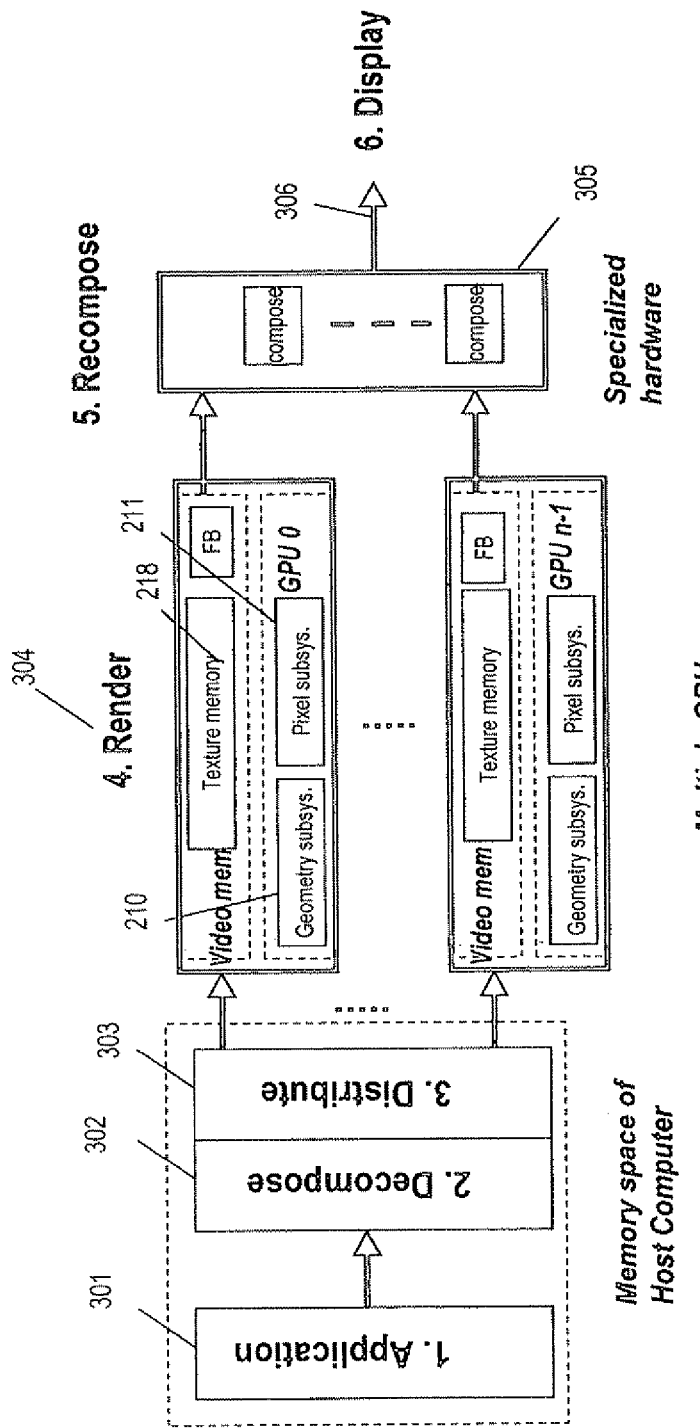
Fig. 3B1 (Prior art)

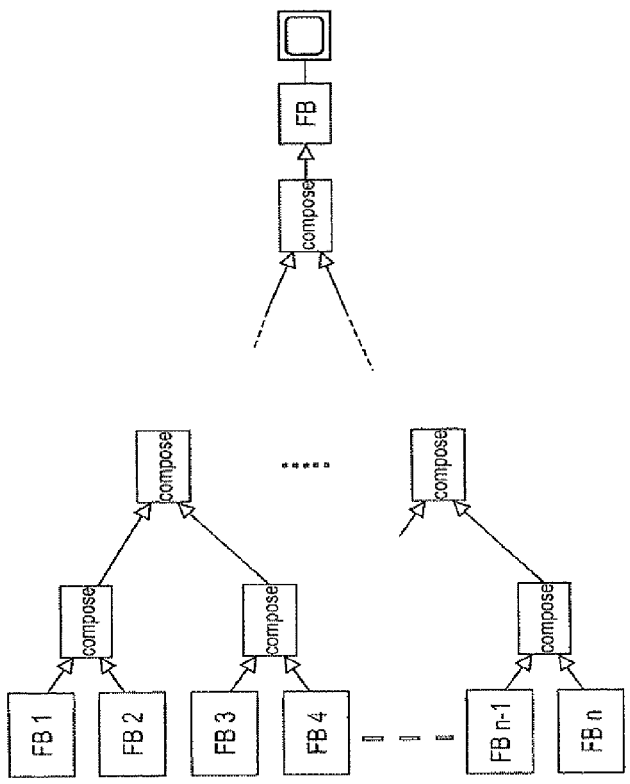
Hardware based recomposition stage during the object division mode of graphics parallel rendering
Fig. 3B2 (Prior art)

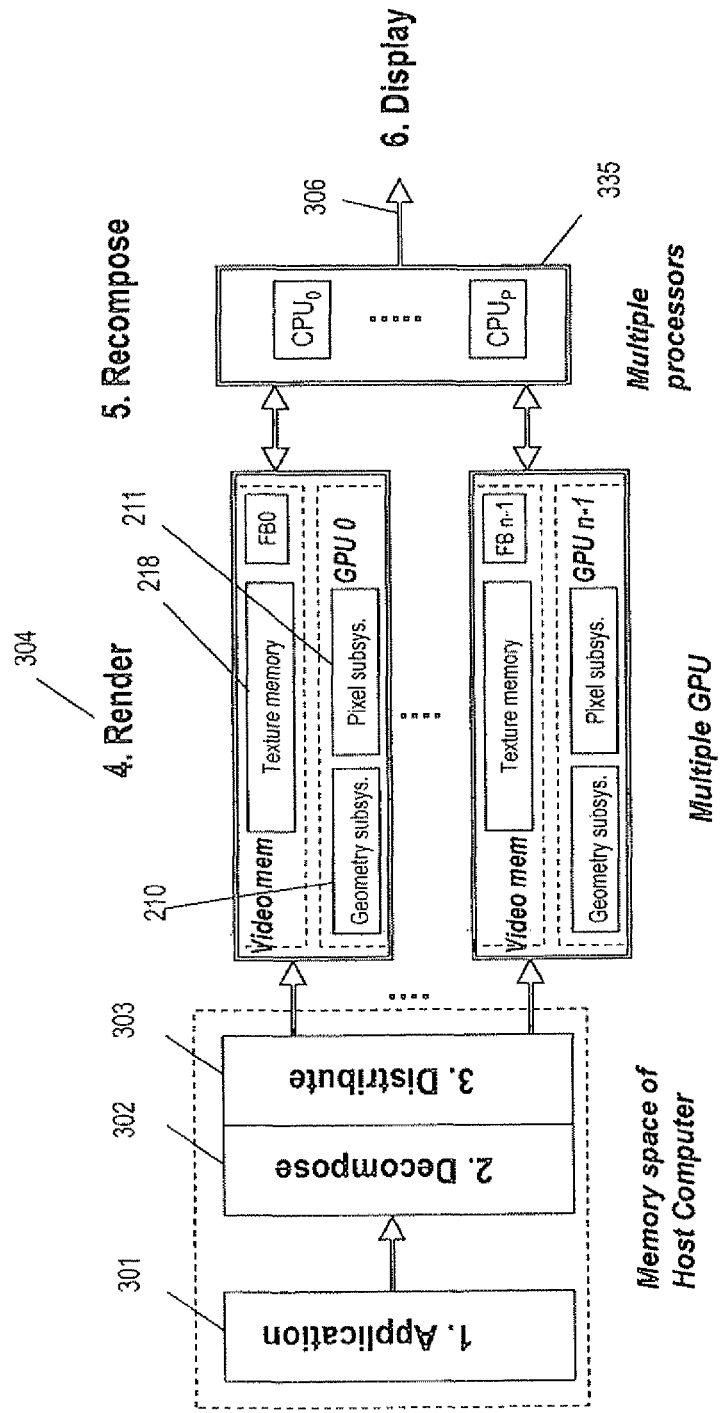
Fig. 3C1 (Prior art)

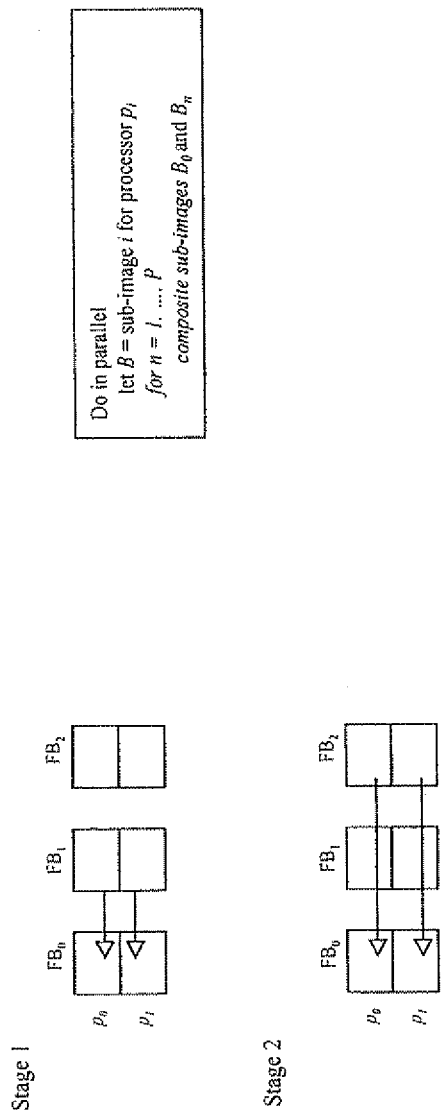

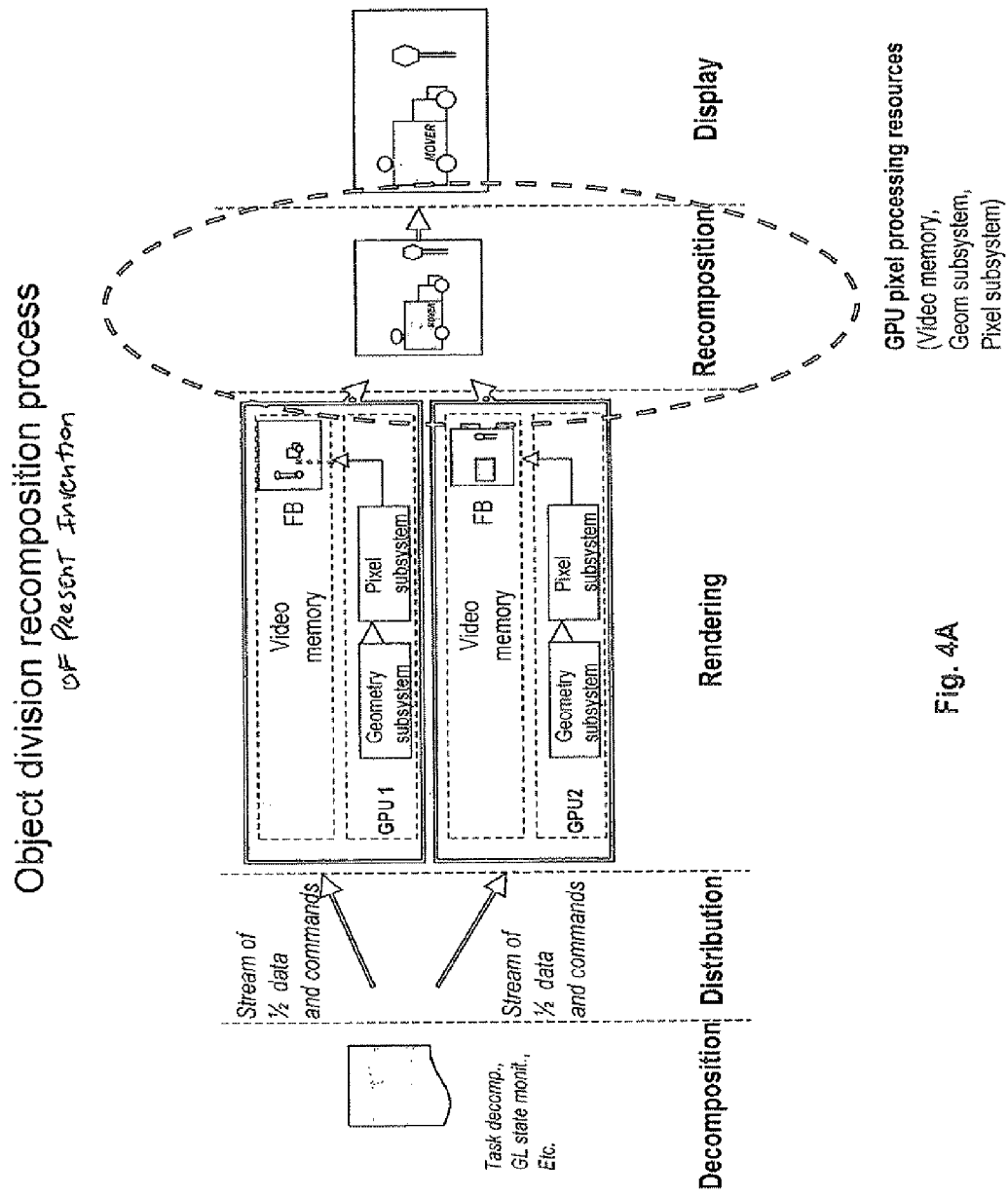

Shader code of the process of illustrative example of present
invention of Fig. 5 (two GPUs)

```
uniform sampler2D tex1,tex2;
uniform sampler2D dep1,dep2;
void main(void)
{
    vec4 texel1 = texture2D(tex1,gl_TexCoord[0].st);
    vec4 texel2 = texture2D(tex2,gl_TexCoord[0].st);
    vec4 depth1 = texture2D(dep1,gl_TexCoord[0].st);
    vec4 depth2 = texture2D(dep2,gl_TexCoord[0].st);
    vec4 color = texel1;
    if (depth1.r > depth2.r) {
        color = texel2;
    }
    else if ((depth1.r == depth2.r) && (depth1.g > depth2.g)) {
        color = texel2;
    }
    else if ((depth1.r == depth2.r) && (depth1.g == depth2.g) && (depth1.b > depth2.b)) {
        color = texel2;
    }
    gl_FragColor = (color);
}
```

Fig. 6B

Artist's concept of a multiple GPU chip

PARALLEL GRAPHICS SYSTEM EMPLOYING MULTIPLE GRAPHICS PROCESSING PIPELINES WITH MULTIPLE GRAPHICS PROCESSING UNITS (GPUS) AND SUPPORTING AN OBJECT DIVISION MODE OF PARALLEL GRAPHICS PROCESSING USING PROGRAMMABLE PIXEL OR VERTEX PROCESSING RESOURCES PROVIDED WITH THE GPUS

BACKGROUND OF THE INVENTION

1. Field of Invention

The present invention relates to new and improved ways of and means for carrying out the object division method of parallel graphics rendering on multiple GPU-based graphics platforms associated with diverse types of computing machinery.

2. Brief Description of the State of the Knowledge in the Art

There is a great demand for high performance three-dimensional (3D) computer graphics systems in the fields of product design, simulation, virtual-reality, video-gaming, scientific research, and personal computing (PC). Clearly a major goal of the computer graphics industry is to realize real-time photo-realistic 3D imagery on PC-based workstations, desktops, laptops, and mobile computing devices.

In general, there are two fundamentally different classes of machines in the 3D computer graphics field, namely: (1) Graphical Display List (GDL) based systems, wherein 3D scenes and objects are represented as a complex of geometric models (primitives) in 3D continuous geometric space, and 2D views or images of such 3D scenes are computed using geometrical projection, ray tracing, and light scattering/reflection/absorption modeling techniques, typically based upon laws of physics; and (2) VOlume ELement (VOXEL) based systems, wherein 3D scenes and objects are represented as a complex of voxels (x,y,z volume elements) represented in 3D Cartesian Space, and 2D views or images of such 3D voxel-based scenes are also computed using geometrical projection, ray tracing, and light scattering/reflection/absorption modeling techniques, again typically based upon laws of physics. Examples of early GDL-based graphics systems are disclosed in U.S. Pat. No. 4,862,155, whereas examples of early voxel-based 3D graphics systems are disclosed in U.S. Pat. No. 4,985,856, each incorporated herein by reference in its entirety.

In the contemporary period, most PC-based computing systems include a 3D graphics subsystem based the "graphics display list (GDL)" system design. In such graphics system design, "objects" within a 3D scene are represented by 3D geometrical models, and these geometrical models are typically constructed from continuous-type 3D geometric representations including, for example, 3D straight line segments, planar polygons, polyhedra, cubic polynomial curves, surfaces, volumes, circles, and quadratic objects such as spheres, cones, and cylinders. These 3D geometrical representations are used to model various parts of the 3D scene or object, and are expressed in the form of mathematical functions evaluated over particular values of coordinates in continuous Cartesian space. Typically, the 3D geometrical representations of the 3D geometric model are stored in the format of a graphical display list (i.e. a structured collection of 2D and 3D geometric primitives). Currently, planar polygons, mathematically described by a set of vertices, are the most popular form of 3D geometric representation.

Once modeled using continuous 3D geometrical representations, the 3D scene is graphically displayed (as a 2D view of the 3D geometrical model) along a particular viewing direction, by repeatedly scan-converting the graphical display list. At the current state of the art, the scan-conversion process can be viewed as a "computational geometry" process which involves the use of (i) a geometry processor (i.e. geometry processing subsystem or engine) as well as a pixel processor (i.e. pixel processing subsystem or engine) which together transform (i.e. project, shade and color) the display-list objects and bit-mapped textures, respectively, into an unstructured matrix of pixels. The composed set of pixel data is stored within a 2D frame buffer (i.e. Z buffer) before being transmitted to and displayed on the surface of a display screen.

A video processor/engine refreshes the display screen using the pixel data stored in the 2D frame buffer. Any changes in the 3D scene requires that the geometry and pixel processors repeat the whole computationally-intensive pixel-generation pipeline process, again and again, to meet the requirements of the graphics application at hand. For every small change or modification in viewing direction of the human system user, the graphical display list must be manipulated and repeatedly scan-converted. This, in turn, causes both computational and buffer contention challenges which slow down the working rate of the graphics system. To accelerate this computationally-intensive pipeline process, custom hardware including geometry, pixel and video engines, have been developed and incorporated into most conventional "graphics display-list" system designs.

In high-performance graphics applications, the number of computations required to render a 3D scene (from its underlying graphical display lists) and produce high-resolution graphical projections greatly exceeds the capabilities of systems employing a single graphics processing unit (GPU). Consequently, the use of parallel graphics pipelines, and multiple graphics processing units (GPUs), have become the rule for high-performance graphics system architecture and design.

In order to distribute the computational workload associated with interactive parallel graphics rendering processes, three different methods of graphics rendering have been developed over the years. These three basic methods of parallel graphics rendering are illustrated in FIGS. 1A through 1C. While these three methods of parallel graphics rendering are different in ways which will be described below, they each have five (5) basic stages or phases in common, namely:

(1) the Decomposition Phase, wherein the 3D scene or object is analyzed and its corresponding graphics display list data and commands are assigned to particular graphics pipelines available on the parallel multiple GPU-based graphics platform;

(2) the Distribution Phase, wherein the graphics display list data and commands are distributed to particular available graphics pipelines determined during the Decomposition Phase;

(3) the Rendering Phase, wherein the geometry processing subsystem/engine and the pixel processing subsystem/engine along each graphics pipeline of the parallel graphics platform uses the graphics display list data and commands distributed to its pipeline, and transforms (i.e. projects, shades and colors) the display-list objects and bit-mapped textures into a subset of unstructured matrix of pixels;

(4) the Recomposition Phase, wherein the parallel graphics platform uses the multiple sets of pixel data generated by each graphics pipeline to synthesize (or compose) a final set of pixels that are representative of the 3D scene (taken along the specified viewing direction), and this final set of pixel data is then stored in a frame buffer; and (5) the Display Phase, wherein the final set of pixel data retrieved from the frame buffer; and provided to the screen of the device device of the system. As will be explained below with reference to FIGS. 1A through 1C, each of these methods of parallel graphics rendering has both advantages and disadvantages.

Image Division Method of Parallel Graphics Rendering

As illustrated in FIG. 1A, the Image Division (Sort-First) Method of Parallel Graphics Rendering distributes all graphics display list data and commands to each of the graphics pipelines, and decomposes the final view (i.e. projected 2D image) in Screen Space, so that, each graphical contributor (e.g. graphics pipeline and GPU) renders a 2D tile of the final view. This mode has a limited scalability due to the parallel overhead caused by objects rendered on multiple tiles.

Time Division (DPlex) Method of Parallel Graphics Rendering

As illustrated in FIG. 1B, the Time Division (DPlex) Method of Parallel Graphics Rendering distributes all display list graphics data and commands associated with a first scene to the first graphics pipeline, and all graphics display list data and commands associated with a second/subsequent scene to the second graphics pipeline, so that each graphics pipeline (and its individual rendering node or GPU) handles the processing of a full, alternating image frame. Notably, while this method scales very well, the latency between user input and final display increases with scale, which is often irritating for the user.

Object Division (Sort-Last) Method of Parallel Graphics Rendering

As illustrated in FIG. 1C, the Object Division (Sort-last) Method of Parallel Graphics Rendering decomposes the 3D scene (i.e. rendered database) and distributes graphics display list data and commands associated with a portion of the scene to the particular graphics pipeline (i.e. rendering unit), and recombines the partially rendered pixel frames, during recomposition. This mode scales the rendering process very well, but implementation of the recomposition step is very expensive due to the amount of pixel data processing required during recomposition. Consequently, the practice of the Object Division Method of Parallel Graphics Rendering has not been commerically feasible in the affordable PC computing marketplace, while the Image and Time Division Methods of Parallel Graphics Rendering are being widely practiced in commercial PC-based graphics products, as indicated above.

A primary and highly desirable advantage associated with the Object Division Method of Parallel Graphics Rendering stems from dividing the stream of graphic display commands and data into partial streams, targeted to different GPUs, thereby removing traditional bottlenecks associated with polygon and texture data processing. Applications with massive polygon data (such as CAD) or massive texture data (such as high-quality video games) are able to take the most advantage of this kind of graphics rendering parallelism. Thus, there is a real need for CAD workers and video gamers who typically use PC-based computing systems and workstations have access to computer graphics subsystems that support the Object Division Method of Parallel Graphics Rendering.

Particular Prior Art Examples of Time Division and Image Division Methods of Parallel Graphics Rendering In order to increase the level of parallelism and thus rendering performance of conventional PC-based graphics systems (i.e. beyond the converge limitations of a single-core GPU), it is now popular for conventional PC computing platforms to practice the Image and Time Division Methods of Parallel Graphics Rendering using either multiple GPU-based graphics cards, or multiple GPU chips on a graphics card. As shown in FIGS. 2A and 2B, this parallel graphics processing technique is practiced today in a number of commercial products (e.g. the SLI™ product design by Nvidia, and the Crossfire™ product design by ATI), employing a dual-card graphics subsystem, and supporting both Image and Time Division Methods/Modes of Parallel Graphics Rendering.

As shown in FIG. 2A, the PC motherboard is populated with a CPU (201) that is equipped with a memory bridge (i.e. "chipset," 203) (e.g. nforce 680 by Nvidia). The memory bridge supports two PCI-express buses (207, 208) which are capable of driving two external graphic cards. As shown in FIG. 2A, the primary graphics card (205) and the secondary graphics card (204) are attached to a display device (206) such as a LCD panel. As shown in FIG. 2B, the architecture of a typical Shader-based graphic card (204, 205) comprises a GPU (212) and video memory (213). The GPU comprises a geometry subsystem (which is transform bound) and a pixel subsystem (which is fill bound). The video memory (213) comprises texture memory (218), a frame buffer (216), a command buffer, and a vertex buffer. The stream of graphics (display list) data and commands, originating at the host CPU, describes the 3D scene in terms of polygon vertices and bit-mapped textures. As shown, this data stream is provided to the video memory (213) via PCIexpress bus (207 or 208). In the shader-based GPU, the texture memory (218) plays a central role, and is accessible to and from the chip input, the vertex and fragment shaders, FB (216), and the blend & raster ops unit (217). As shown, the shader hardware (214, 215) is realized as a programmable parallel array of processing elements running shader source code written in a graphics-specific programming language. Notably, the Vertex Shader (214) specializes in vertex data processing, whereas the Fragment Shader (215) specializes in pixel data processing.

Particular Prior Art Examples of Object Division Method of Parallel Graphics Rendering In FIG. 3A1, there is shown a parallel graphics system supporting the Object Division Method of Parallel Graphics Rendering, as illustrated as in FIG. 1C, but with further emphasis on the Recomposition Stage which is shown carried out using specialized apparatus. In FIG. 3A2, the basic object division recomposition process carried out by such specialized apparatus is schematically illustrated in the form of a flow chart. As described in FIG. 3A2, the first step of this pixel composition process involves accessing images (pixel data sets) from first and second frame buffers (FB1, FB20, each having a color value buffer and a depth value (Z) buffer. The second step involves performing a relatively simple process for each x,y pixel value in the frame buffers: advance to the next x,y location; for x,y, compare the depth values in the Z buffers and select the lower value which corresponds to the pixel value closest to the view (along the specified viewing direction); move the corresponding pixel value from the color buffer associated with the winning Z-buffer1 to the final FB. The determine whether or not all x,y values in the image have been processed as described above. If not, then return to the beginning of the processing loop as shown, and continue to process all pixel values in the image until the composition process is completed.

In FIGS. 3B1 and 3B2, there is shown a prior art multiple GPU-based graphics subsystem having multiple graphics pipelines with multiple GPUs supporting the Object Division Method of Parallel Graphics Rendering, using dedicated/specialized hardware to perform the basic image recomposition process illustrated in FIG. 3A2. Examples of prior art parallel graphics systems based on this design include: the Chromium™ Parallel Graphics System developed by researchers and engineers of Stanford University, and employing Binaryswap SPU hardware to carry out the image (re)composition process illustrated in FIG. 3A2; and HP Corporation's PixelFlow (following development of North Carolina University at Chapel Hill) employing parallel pipeline hardware, and SGI's Origin 2000 Supercomputer Shared Memory Compositor method (known also as "Direct Send") on distributed memory architecture.

As shown in FIG. 3B1, the application's rendering code (301), which is representative of a 3D scene to be viewed from a particular viewing direction, is decomposed into two streams of graphics (display list) data and commands (302). These streams of graphics data and commands (302) are distributed (303) to the multiple graphics processing pipelines for rendering (304). Each GPU in its pipeline participates in only a fraction of the overall computational workload. Each frame buffer (FB) holds a full 2D image (i.e. frame of pixel data) of a sub-scene. According to this prior art method of Object Division, the full image of the 3D scene must be then composed from the viewing direction, using these two full 2D images, and this compositing process involves testing each and every pixel location for the pixel that is closest to the eye of the viewer (305). Consequently, recomposition according to this prior art Object Division Method of Parallel Graphics Rendering is expensive due to the amount of pixel data processing required during recomposition. The recomposed final FB is ultimately sent to the display device (306) for display to the human viewer.

As shown in FIG. 3B2, the dedicated/specialized hardware-based recomposition stage/phase of the object division mode of the parallel graphics rendering process of FIG. 3B1 comprises multiple stages of frame buffers (FBs), wherein each graphics pipeline will have at least one FB. In each FB, there is buffered image data comprising pixel color and depth (z) values. These pixel color and depth (z) values are processed according to the basic pixel processing algorithm of FIG. 3A2, so as to ultimately compose the final pixel data set (i.e. image) which is stored in the final frame buffer. The pixel data stored in the final frame buffer is then ultimately used to display the image on the screen of the display device using conventional video processing and refreshing techniques generally known in the art. Notably, the more graphics processing pipelines (GPUs) that are employed in the parallel graphics rendering platform, the more complex and expensive the dedicated hardware becomes to practice this prior art hard-ware based recomposition technique during the object division mode of such a parallel graphics rendering platform.

In FIGS. 3C1, 3C2 and 3C3, there is shown a prior art multiple GPU-based graphics subsystem having multiple graphics pipelines with multiple GPUs supporting the Object Division Method of Parallel Graphics Rendering, using a dedicated/specialized software solution to perform the basic image recomposition process illustrated in FIG. 3A2. Examples of prior art parallel graphics systems based on this design include: the Onyx® Parallel Graphics System developed by SGI, and employing pseudocode illustrated in FIGS. 3C2 and 3C3, to carry out the image (re)composition process illustrated in FIG. 3A2.

As shown in FIG. 3C1, the application's rendering code (301), which is representative of a 3D scene to be viewed from a particular viewing direction, is decomposed into two streams of graphics (display list) data and commands (302). These streams of graphics data and commands (302) are distributed (303) to the multiple graphics processing pipelines for rendering (304). Each GPU in its pipeline participates in only a fraction of the overall computational workload. Each frame buffer (FB) holds a full 2D image (i.e. frame of pixel data) of a sub-scene. According to this prior art method of Object Division, the full image of the 3D scene must be then composed from the viewing direction, using these two full 2D images, and this compositing process involves testing each and every pixel location for the pixel that is closest to the eye of the viewer (305). Consequently, recomposition according to this prior art Object Division Method of Parallel Graphics Rendering is expensive due to the amount of pixel data processing required during recomposition. The recomposed final FB is ultimately sent to the display device (306) for display to the human viewer.

In FIGS. 3C2, the software-based recomposition stage/phase of the object division mode of the parallel graphics rendering process of FIG. 3C1 is schematically illustrated in greater detail. As shown, this prior art image (re)composition process involves using a dedicated/specialized computational platform to implement the basic pixel processing algorithm of FIG. 3A2. As In general, this comprising dedicated/specialized computational platform comprises a plurality of CPUs for accessing and composite-processing the pixel color and z depth values of the pixel data sets buffered in the frame buffers (FBs) of each graphics pipeline supported on the parallel graphics platform. In the FB of each graphics pipeline (i.e. GPU), there is buffered image data comprising pixel color and depth (z) values. In FIG. 3C2, there is shown an illustrative example of a dedicated software-based recomposition platform employing two CPUs, and a final frame buffer FB0, to support a dual GPU-based parallel graphics rendering platform. The pixel color and depth (z) values stored in FB1 and FB2 are processed according to the basic pixel processing algorithm of FIG. 3A2, so as to ultimately compose the final pixel data set (i.e. image) which is stored in the final frame buffer FB0. FIG. 3C3 shows pseudocode that is executed by each CPU on the recomposition platform in order to carry out the pixel processing algorithm described in FIG. 3A2. The pixel data stored in the final frame buffer is then ultimately used to display the image on the screen of the display device using conventional video processing and refreshing techniques generally known in the art. Notably, the more graphics processing pipelines (GPUs) that are employed in the parallel graphics rendering platform, the more complex and expensive the software-based recomposition platform becomes to practice this prior art software based recomposition technique during the object division mode of such a parallel graphics rendering platform.

In both prior art parallel graphics systems described in FIGS. 3B1 and 3B2 and 3C1 through 3C3, the image recomposition step requires the use of dedicated or otherwise specialized computational apparatus which, when taken together with the cost associated with computational machinery within the multiple GPUs to support the rendering phase of the parallel graphics process, has put the Object Division Method outside limits of practicality and feasibility for use in connection with PC-based computing systems.

Thus, there is a great need in the art for a new and improved way of and means for practicing the object division method of parallel graphics rendering in computer graphics systems, while avoiding the shortcomings and drawbacks of such prior art methodologies and apparatus.

OBJECTS AND SUMMARY OF THE PRESENT INVENTION

Accordingly, a primary object of the present invention is to provide a new and improved method of and apparatus for supporting the object division method of parallel graphics rendering, while avoiding the shortcomings and drawbacks associated with prior art apparatus and methodologies.

Another object of the present invention is to provide such apparatus in the form of a multiple graphics processing unit (GPU) based parallel graphics system having multiple graphics processing pipelines with multiple GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated to the video memory of a primary GPU, and wherein the video memory and the pixel processing subsystem in the primary GPU are used to carry out the image recomposition phase of the object division mode of parallel graphics rendering process.

Another object of the present invention is to provide a multiple GPU-based parallel graphics system having multiple graphics processing pipelines with multiple GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated to the video memory of a primary GPU, and wherein the video memory and the pixel processing subsystem in the primary GPU are used to carry out the image recomposition phase of the object division mode of parallel graphics rendering process.

Another object of the present invention is to provide a multiple GPU-based parallel graphics system having multiple graphics processing pipelines with multiple GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated to the video memory of a primary GPU, and wherein the video memory and both the geometry and pixel processing subsystems in the primary GPU are used to carry out the image recomposition phase of the object division mode of parallel graphics rendering process.

Another object of the present invention is to provide such a multiple GPU-based parallel graphics system having multiple graphics processing pipelines with multiple GPUs supporting a parallel graphics rendering process having an object division mode of operation, wherein the video memory of each GPU includes texture memory and a pixel frame buffer, wherein the geometry processing subsystem includes a vertex shading unit, wherein the pixel processing subsystem includes a fragment/pixel shading unit, wherein pixel (color and z depth) data buffered in the video memory of each GPU is communicated to the video memory of a primary GPU, and wherein the texture memory and the fragment/pixel shading unit are used to carry out the image recomposition phase of the object division mode of parallel graphics rendering process.

Another object of the present invention is to provide such a multiple GPU-based parallel graphics system having multiple graphics processing pipelines with multiple GPUs supporting a parallel graphics rendering process having an object division mode of operation, wherein the video memory of each GPU includes texture memory and a pixel frame buffer, wherein the geometry processing subsystem includes a vertex shading unit, wherein the pixel processing subsystem includes a fragment/pixel shading unit, wherein pixel (color and z depth) data buffered in the video memory of each GPU is communicated to the video memory of a primary GPU, and wherein the texture memory and the vertex shading unit are used to carry out the image recomposition phase of the object division mode of parallel graphics rendering process.

Another object of the present invention is to provide such a multiple GPU-based parallel graphics system having multiple graphics processing pipelines with multiple GPUs supporting a parallel graphics rendering process having an object division mode of operation, wherein pixel (color and z depth) data buffered in the video memory of each GPU is communicated to the video memory of a primary GPU, and wherein the texture memory and the vertex shading unit are used to carry out the image recomposition phase of the object division mode of parallel graphics rendering process.

Another object of the present invention is to provide such a multiple GPU-based parallel graphics system, wherein the recomposition stage of the object division mode of the parallel graphics rendering process can be carried out using conventional GPU-based graphics cards originally designed to support the image and time division modes of a parallel graphics rendering process.

Another object of the present invention is to provide such a multiple GPU-based parallel graphics system, wherein the pixel frame buffers within multiple GPUs of a parallel graphics pipeline can be composited without use of specialized and/or additional components of hardware or software.

Another object of the present invention is to provide such a multiple GPU-based parallel graphics system, having low design and manufacturing cost as well as relatively low architectural complexity that is highly suitable for PC-based computing systems, as well as video game consoles and systems widely used in the consumer entertainment industry.

Another object of the present invention is to provide a multiple GPU-based parallel graphics system, having multiple graphics processing pipelines with multiple GPUs supporting a parallel graphics rendering process having an object division mode of operation, wherein the object division mode can be implemented entirely in software, using the same computational resources provided for within the multiple GPUs for the purpose of carrying out the rendering stage of the parallel graphics rendering process (i.e. involving geometry projection, ray tracing, shading and texture mapping) and at cost of implementation that is comparable to the cost of implementation of image division and time division modes of a parallel graphics rendering process.

Another object of the present invention is to provide a multiple GPU-based parallel graphics system, having multiple graphics processing pipelines with multiple GPUs supporting a parallel graphics rendering process having an object division mode of operation, which does not require compositing in main, shared or distributed memory of the host system (e.g. involving the movement of pixel data from the frame buffers or FBs to main memory, processing the pixel data in the CPU of the host for composition, and moving the result out to the GPU for display) thereby avoiding the use of expensive procedure and resources of the system (e.g. buses, caches, memory, and CPU).

Another object of the present invention is to provide a novel method of operating a multiple GPU-based parallel graphics system, having multiple graphics processing pipelines (e.g. cards) with multiple GPUs supporting a parallel graphics rendering process having an object division mode of operation, wherein implementation of the pixel composition phase of the parallel graphics rendering process is carried out using the computational resources within the GPUs, thereby avoiding the need for dedicated or specialized pixel image compositing hardware and/or software based apparatus.

Another object of the present invention is to provide a novel method of converting a multiple GPU-based parallel graphics system supporting a parallel graphics rendering process having a time and/or image division mode of operation, into a multiple GPU-based parallel graphics system supporting a parallel graphics rendering process having an object division mode of operation, Another object of the present invention is to provide a novel process of parallel graphics rendering having an object division mode of operation, which can be implemented on conventional as well as non conventional multiple GPU-based graphics platforms.

Another object of the present invention is to provide a novel process of parallel graphics rendering having an object division mode of operation, which can be implemented on any special purpose graphic systems requiring an image composition or comparable pixel compositing processes.

Another object of the present invention is to provide a novel parallel graphics rendering system supporting an object division mode of operation, and which can be implemented on conventional multiple GPU-based platforms so as to replacing image division or time division parallelism supported by the original equipment manufacturer (OEM), Another object of the present invention is to provide a novel parallel graphics rendering system supporting an object division mode of operation, wherein the vendors of conventional multiple GPU-based graphics platforms can easily incorporate object division modes of operation, into their image division and time division modes of operation.

Another object of the present invention is to provide a novel method of parallel graphics rendering which enables the construction of low cost multiple GPU-based cards supporting an object division mode of parallel graphics rendering, with or without other time and/or image division parallelization modes.

Another object of the present invention is to provide a novel method of parallel graphics rendering that enables the construction of reduced-cost silicon chips having multiple GPUs that support an object division mode of parallel graphics rendering for diverse end-user applications.

Another object of the present invention is to provide a novel parallel graphics rendering system supporting an object division mode of operation, which can be embodied within an integrated graphics device (IGD) which is capable of running external GPU-based graphics cards, without the risk of the IGD getting disconnected by the BIOS of the host system when the external GPU-based graphics cards are operating, thereby improving the efficiency and performance of such systems.

Another object of the present invention is to provide a novel parallel graphics rendering system supporting an object division mode of operation, which can be embodied within an integrated graphics device (IGD) which is capable of driving multiple external GPU-based graphics cards.

Another object of the present invention is to provide a novel parallel graphics rendering system supporting an object division mode of operation, which can be embodied within an integrated graphics device (IGD) based chipset having two or more IGDs.

Another object of the present invention is to provide a novel parallel graphics rendering system supporting an object division mode of operation, which allows users to enjoy sharp videos and photos, smooth video playback, astonishing effects, and vibrant colors, as well as texture-rich 3D performance in next-generation games.

These and other objects of the present invention will become apparent hereinafter and in the claims to invention.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below:

Figure 1A:
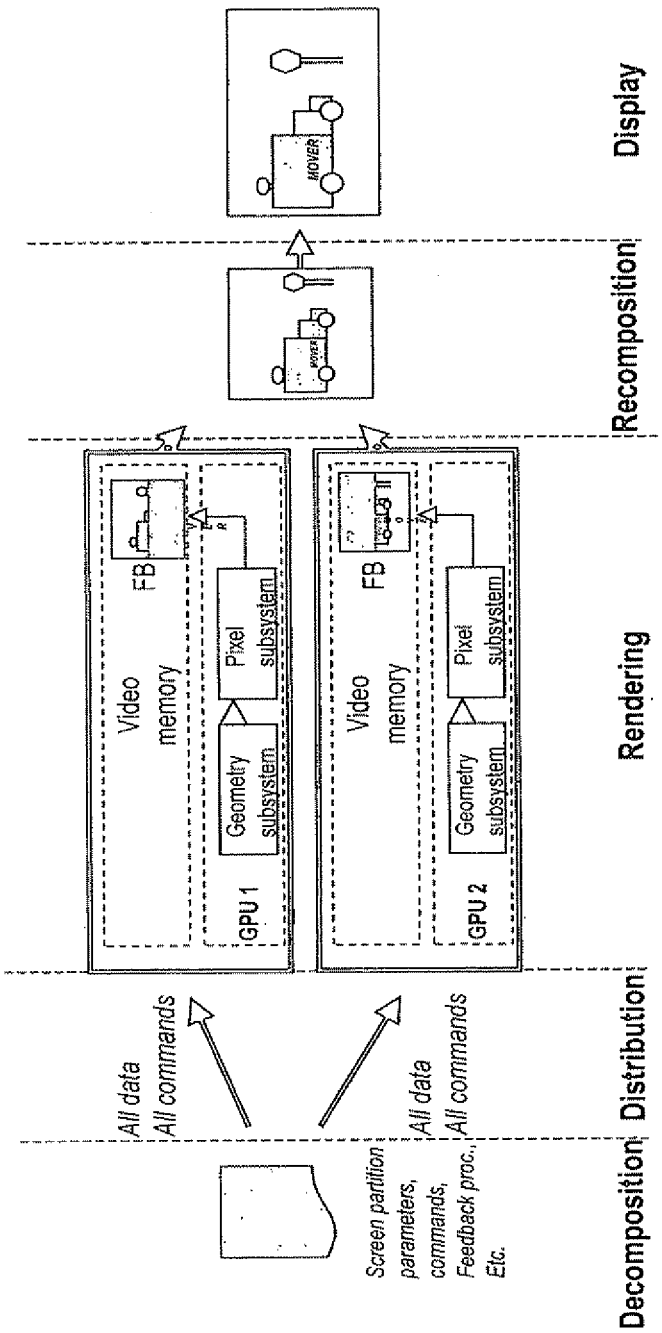
FIG. 1A is a schematic representation illustrating the prior art Image Division Method of Parallel Graphics Rendering on a computer graphics platform employing a pair of graphical processing units (GPUs)
Figure 1B:
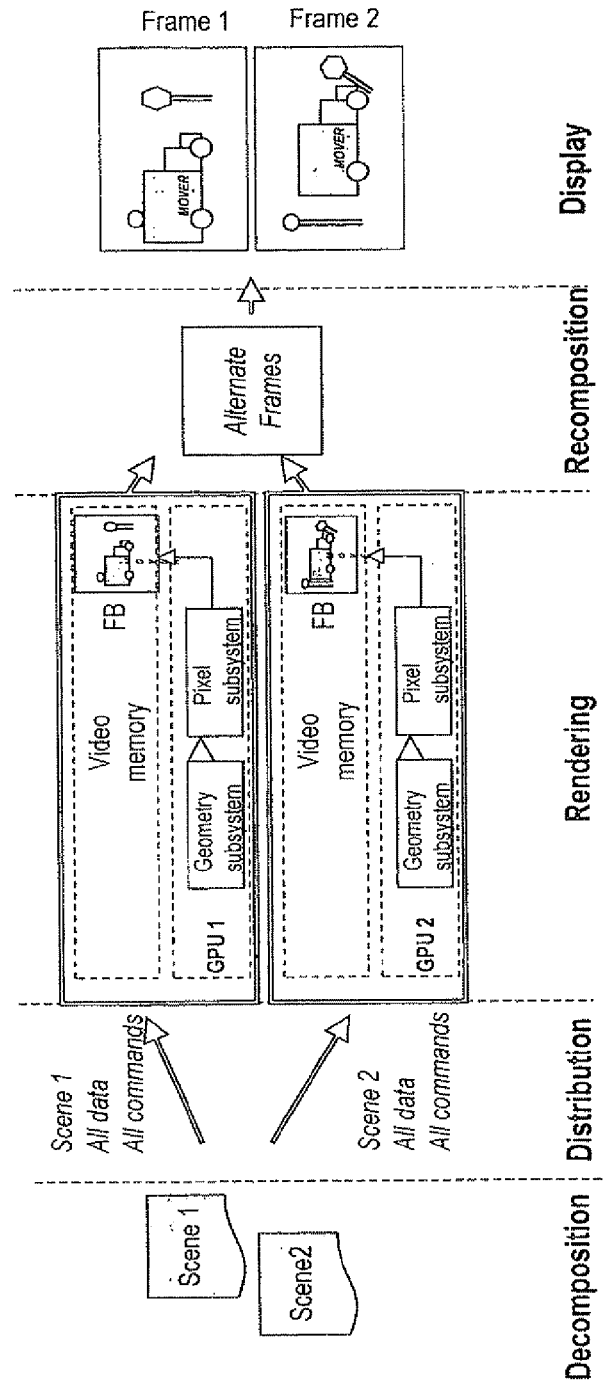
FIG. 1B is a schematic representation illustrating the prior art Time Division Method of Parallel Graphics Rendering on a computer graphics platform employing a pair of graphical processing units (GPUs)
Figure 1C:
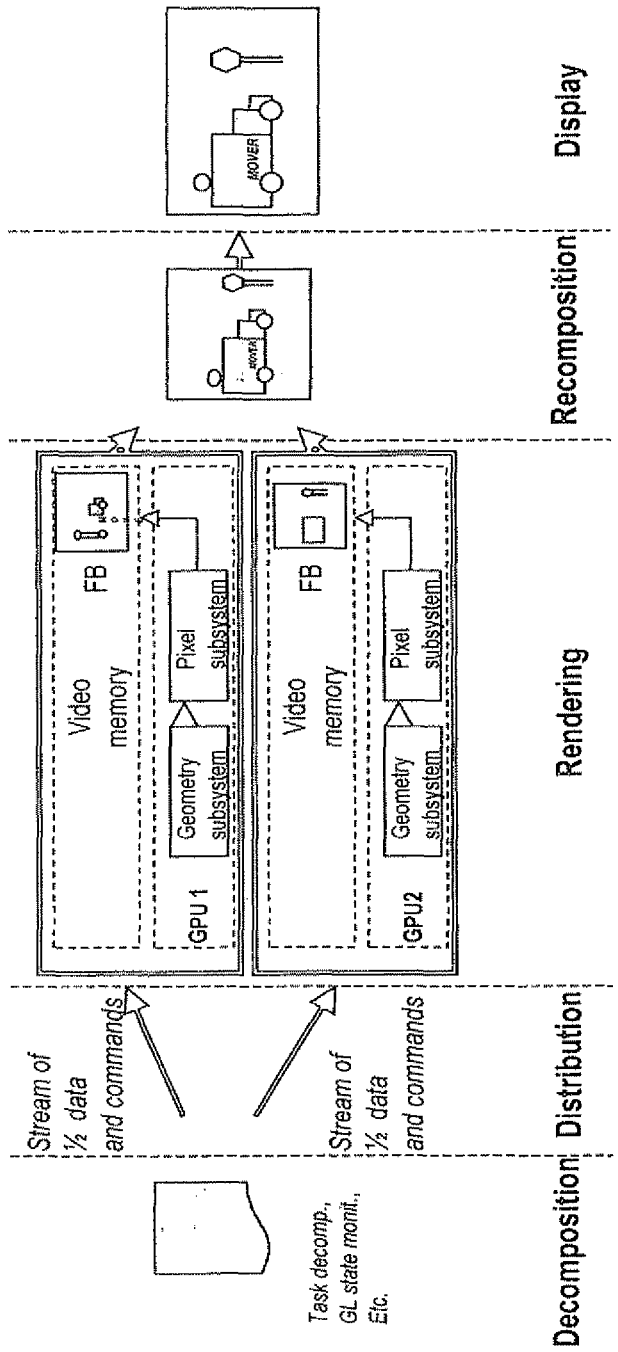
FIG. 1C is a schematic representation illustrating the prior art Object Division Method of Parallel Graphics Rendering on a computer graphics platform employing a pair of graphical processing units (GPUs)
Figure 2A:
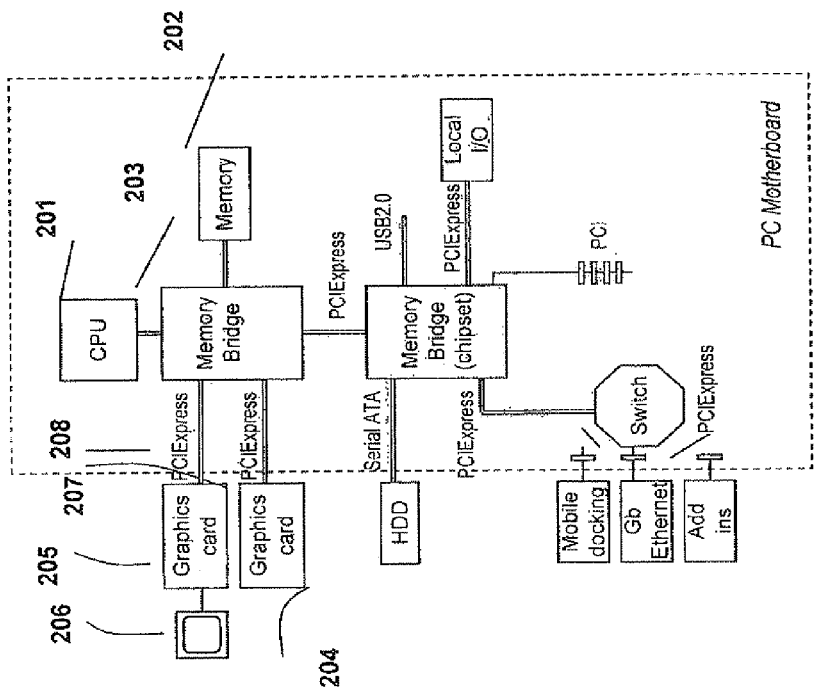
Figure 2B:
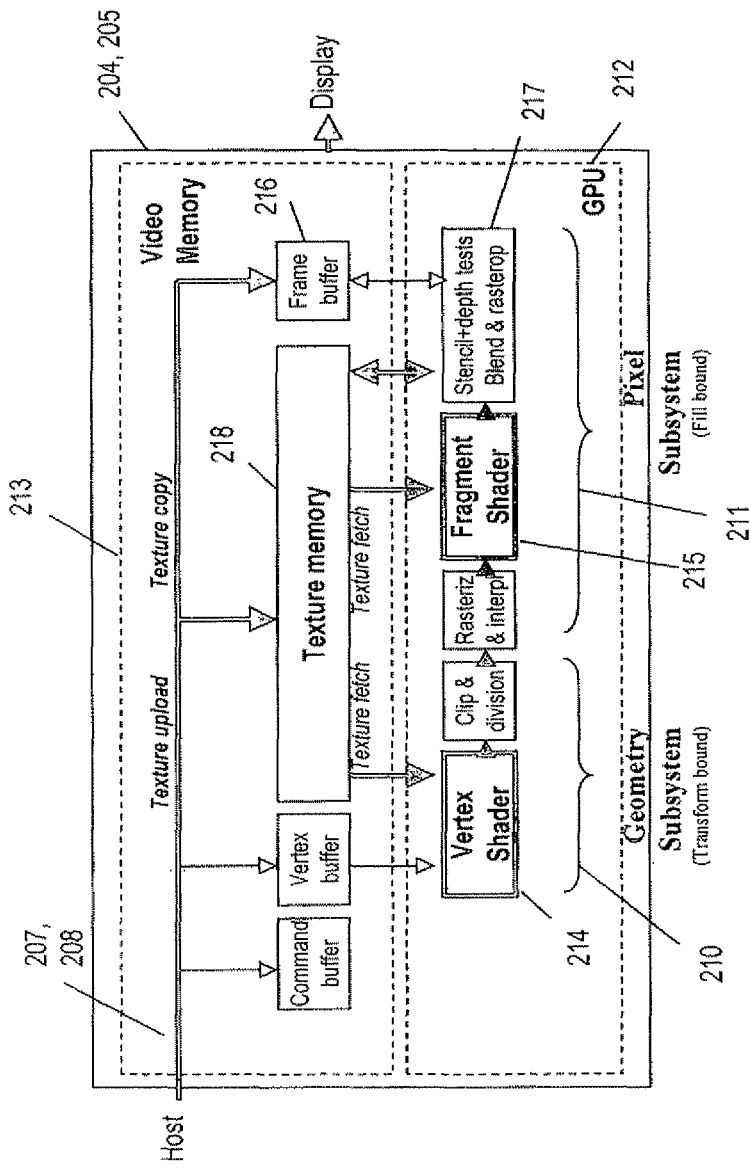
Figure 4B:
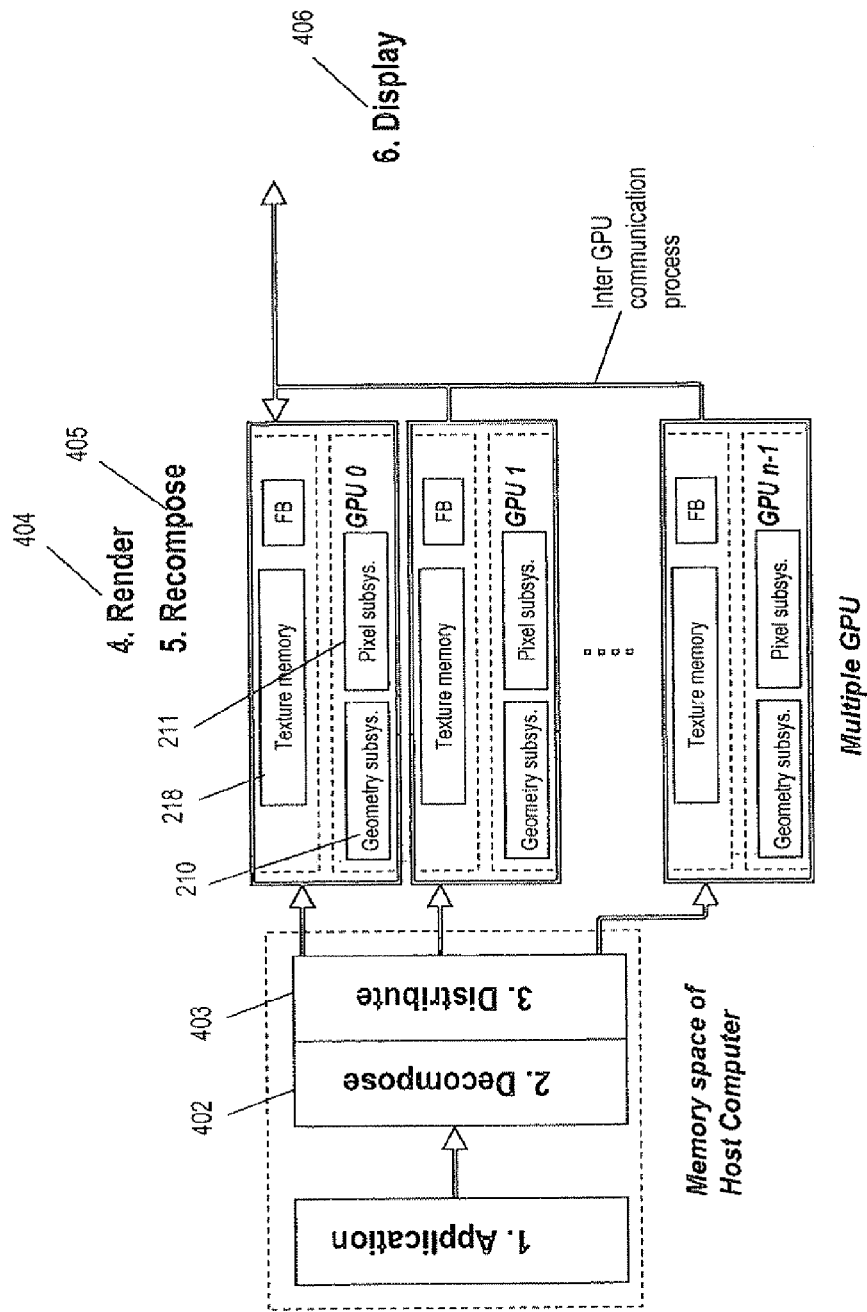
Figure 4C:
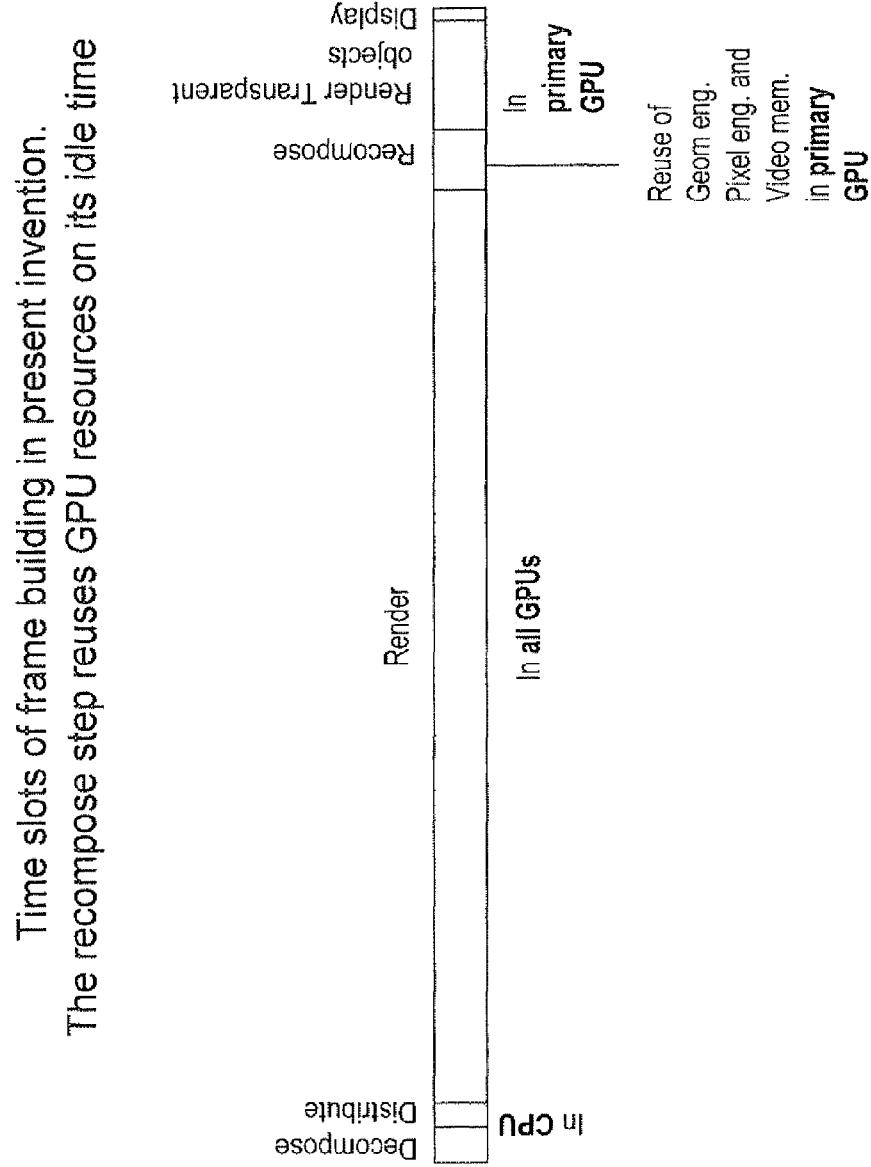
Figure 5A:
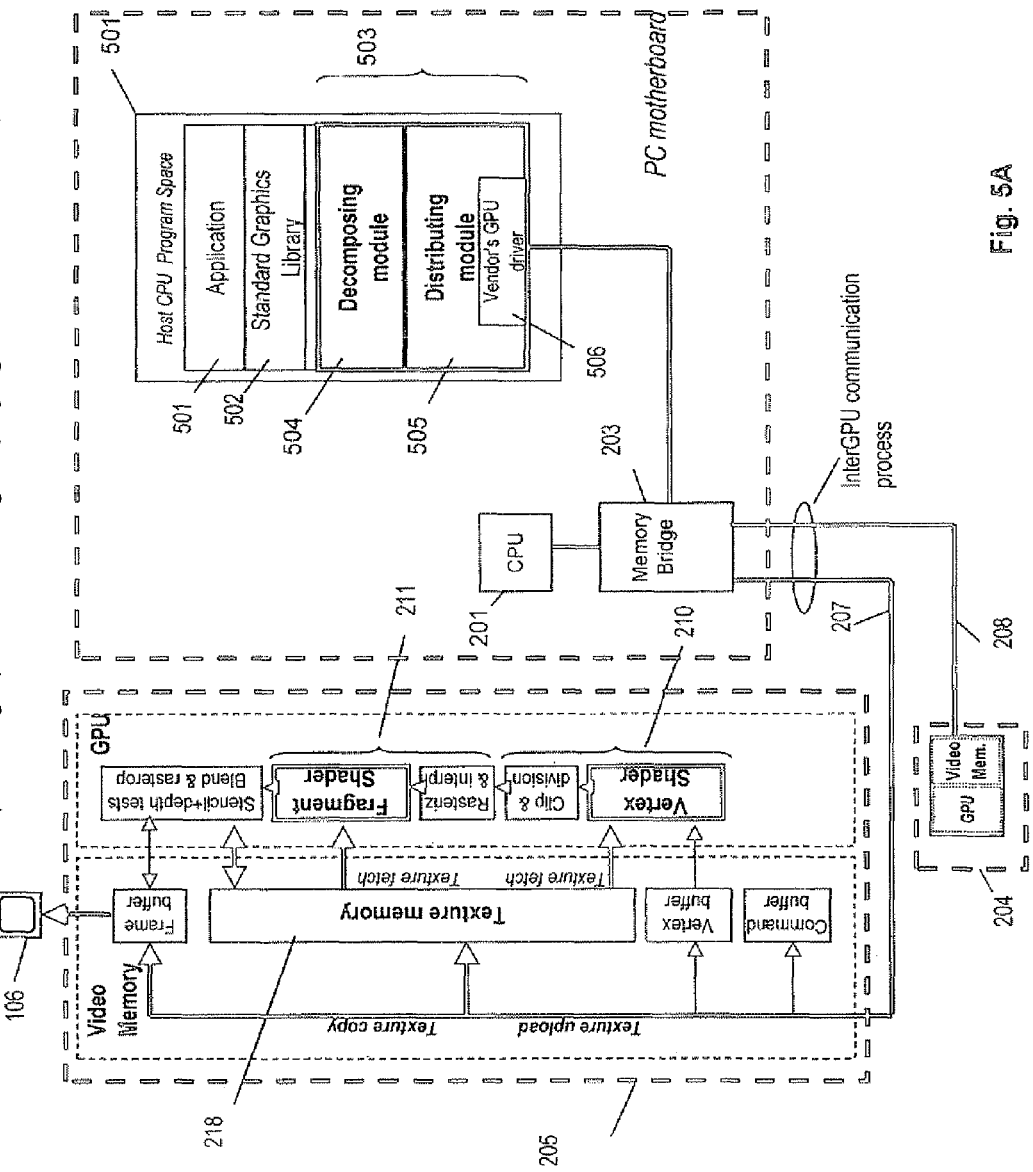
Figure 5B:
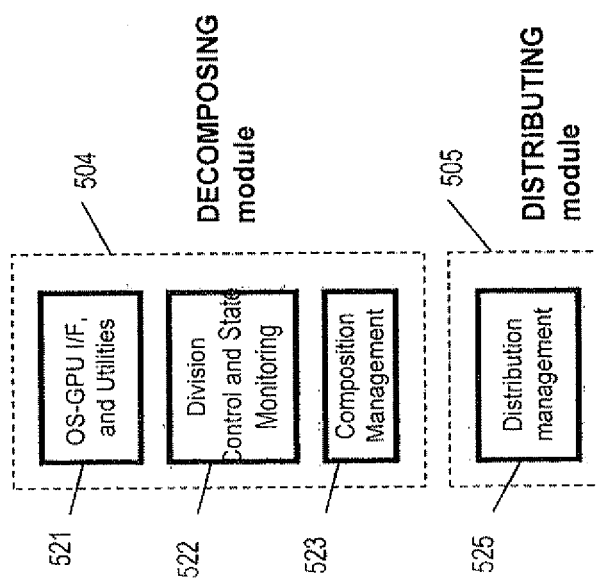
Figure 6A:
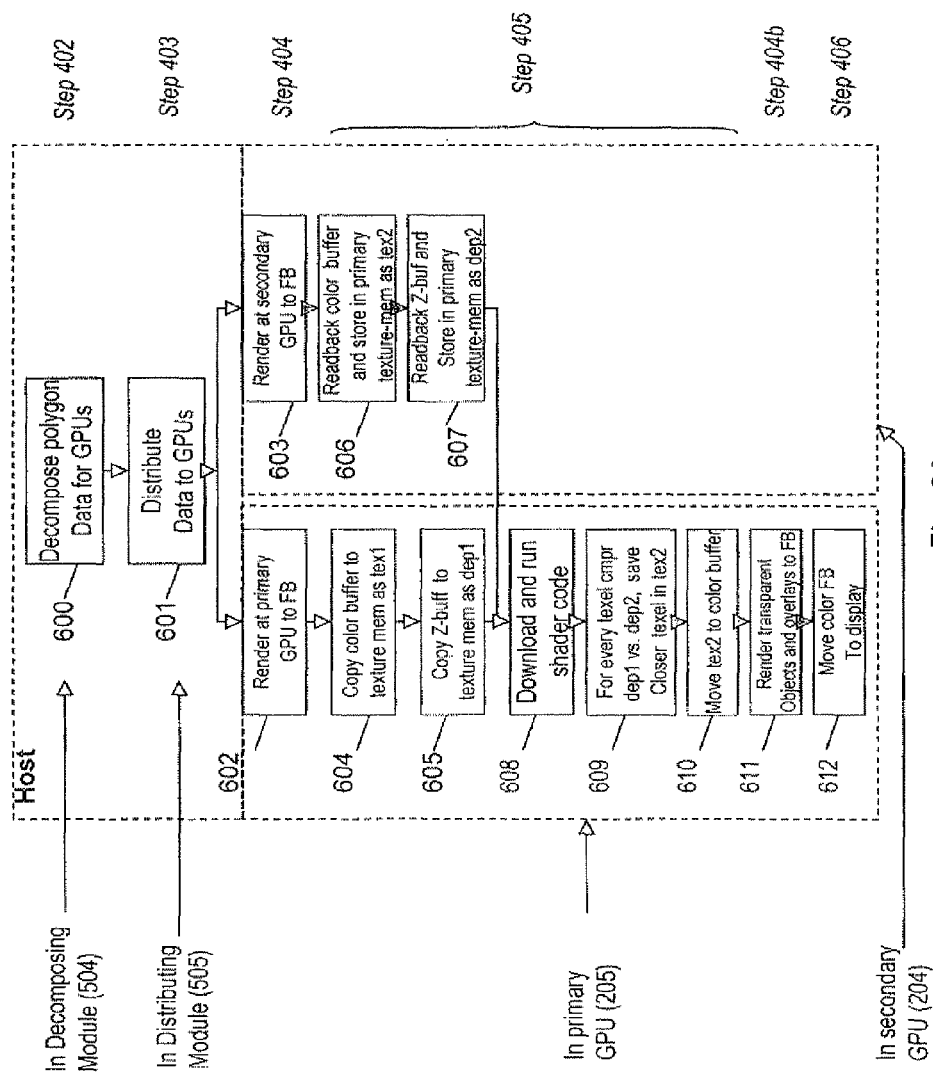
Figure 7A:
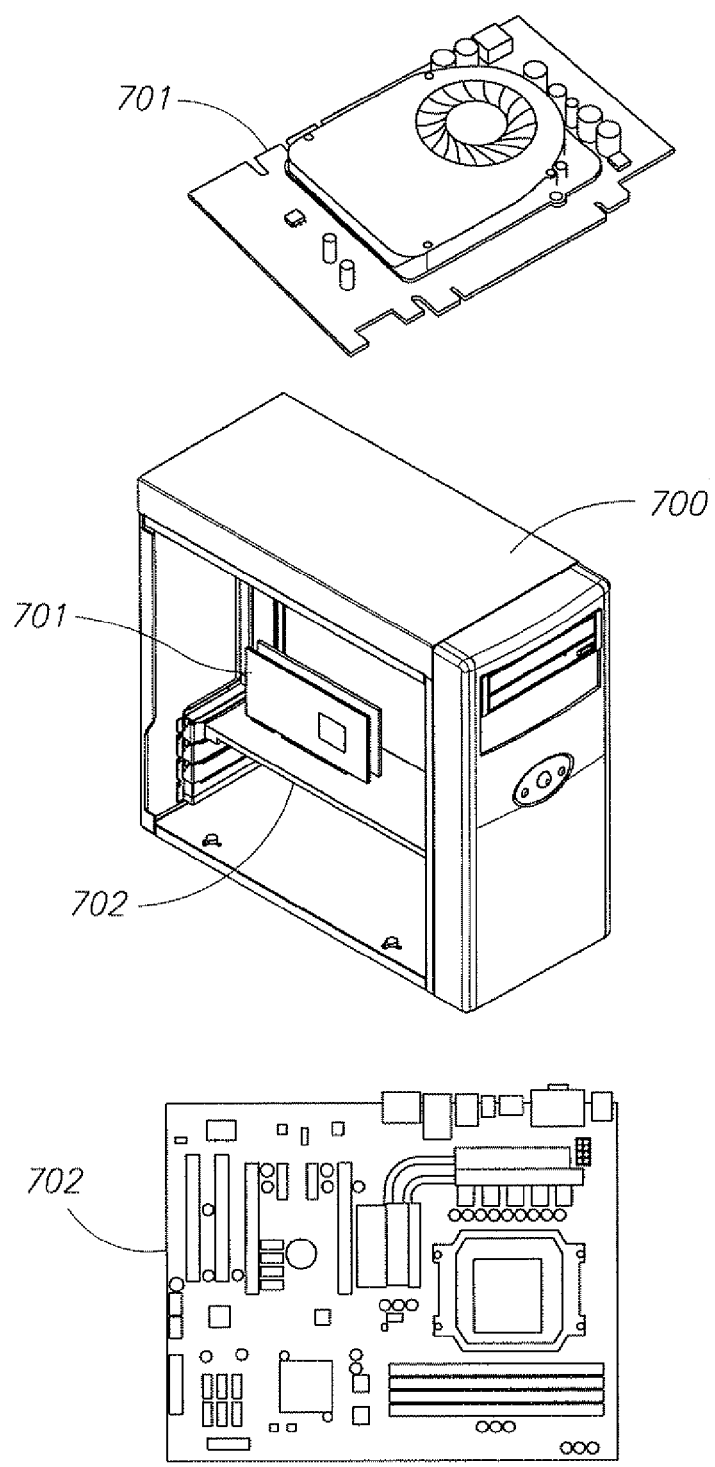
Figure 7B:
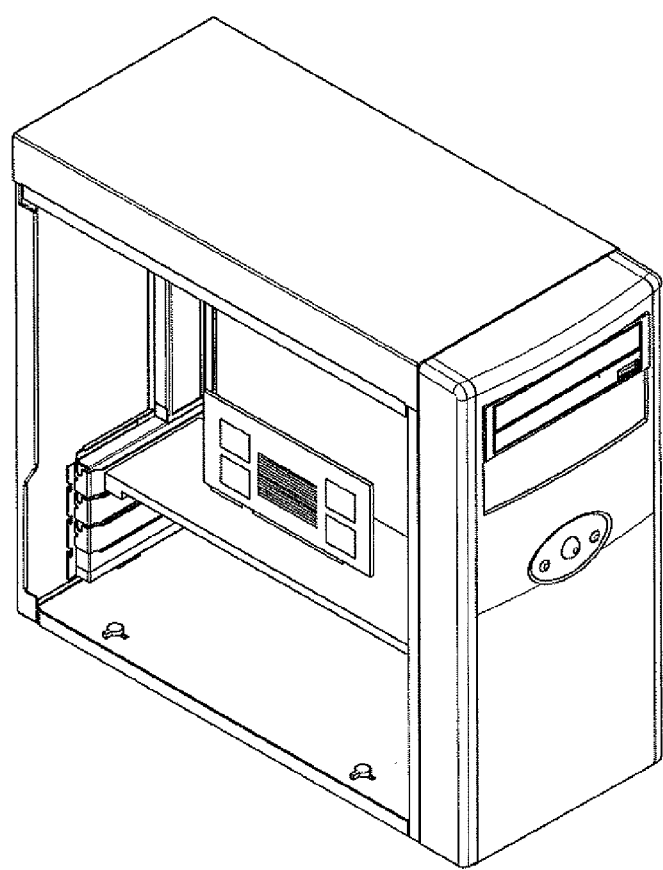

FIG. 2A is a schematic representation of a prior art PC-based computing system employing a dual-GPU graphics subsystem having a chipset (203) (e.g. nForce 680 by Nvidia) with two PCI-express buses (207, 208), driving a pair of external graphic cards (204, 205), and supporting the Image Division Method of Parallel Graphics Rendering (e.g. such as SLI by Nvidia, or Crossfire by AMD, driving 2 or 4 graphic cards);

FIG. 2B is a schematic representation of each prior art graphics card (204, 205) employed in the PC-based computing system of FIG. 2A, shown comprising a GPU (202) and a Video Memory (203), wherein the stream of graphics commands and data, originating at host CPU, describes the 3D scene in terms of vertices and textures, wherein the Shader hardware is a programmable parallel array of processing elements running shader source code written in a graphics specific programming language, wherein the Vertex Shader (214) specializes in vertex processing, the Fragment Shader (215) specializes in pixel processing, and wherein the texture memory (218) is accessible from/to chip input, Shaders, FB (216), and blend & raster ops unit (217);

FIG. 3A1 is a schematic representation illustrating the prior art Object Division Method of Parallel Graphics Rendering on a computer graphics platform employing a pair of graphical processing units (GPUs), wherein emphasis is placed on the fact that the image recomposition stage is implemented using specialized/dedicated apparatus;

FIG. 3A2 is a flow chart illustrating the basic steps associated with the prior art image recomposition process carried out in most object division methods of parallel graphics rendering supported on multiple GPU-based graphics platform;

FIG. 3B1 is a schematic representation illustrating the prior art Object Division Method of Parallel Graphics Rendering on a computer graphics platform employing a multiple graphical processing units (GPUs), wherein the image recomposition stage is implemented using specialized/dedicated hardware-based recomposition apparatus comprising multiple stages of pixel composing units (indicated by COMPOSE);

FIG. 3B2 is a schematics representation of the prior art specialized/dedicated hardware-based recomposition apparatus used to carry out the recomposition stage of the object division mode of graphics parallel rendering process supported on the multiple GPU-based graphics platform shown in FIG. 3B1;

FIG. 3C1 is a schematic representation illustrating the prior art Object Division Method of Parallel Graphics Rendering on a computer graphics platform employing a multiple graphical processing units (GPUs), wherein the image recomposition stage is implemented using specialized/dedicated software-based recomposition apparatus comprising multiple CPUs programmed for pixel composition using a graphics programming language (e.g. Cg);

FIG. 3C2 is a schematics representation of the prior art specialized/dedicated software-based recomposition apparatus used to carry out the recomposition stage of the object division mode of graphics parallel rendering process supported on the multiple GPU-based graphics platform shown in FIG. 3C1, wherein an illustrative example of two CPUs or processors (p0, p1) and three pixel Frame Buffers (FB0, FB1, FB2) provide the apparatus for carrying out the pixel composition process illustrated in FIG. 3A2;

FIG. 3C3 is a prior art pseudo code for programming the processors to carry out the software-based recomposition stage of FIG. 3C2;

FIG. 4A is a schematic representation illustrating the Object Division Method of Parallel Graphics Rendering in accordance with the principles of the present invention, carried out on a parallel graphics platform employing a multiple graphical processing units (GPUs), wherein the recomposition stage of the rendering process is carried out using computational resources (e.g. video memory and the geometry and/or pixel processing subsystems/engines) supplied by the a primary GPU employed on the parallel graphics platform;

FIG. 4B is a schematic representation illustrating a multiple GPU-based parallel graphics system according to the present invention, having multiple graphics processing pipelines with multiple GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated (via an inter-GPU communication process) to the video memory of a primary GPU, and wherein the video memory and the geometry and/or pixel processing subsystems in the primary GPU are used to carry out the image recomposition phase of the object division mode of parallel graphics rendering process;

FIG. 4C is a time-line representation of process of generating a frame of pixels for an image along a specified viewing during a particular parallel rendering cycle in accordance with the principles of the present invention, wherein the pixel recomposition step of the parallel rendering process is shown to reuses GPU-based computational resources during its idle time, without the need for specialized or dedicated compositional apparatus required by prior art parallel graphics systems supporting an object division mode of parallel graphics rendering;

FIG. 5A is a schematic representation of the a dual GPU-based parallel graphics system according to the present invention, having a pair of graphics processing pipelines with a pair of GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated (via an inter-GPU communication process supported over a pair of PCI Express buses) to the video memory of a primary GPU, and wherein the video memory and the geometry and/or pixel processing subsystems in the primary GPU are used to carry out the image recomposition phase of the object division mode of parallel graphics rendering process;

FIG. 5B is a schematic representation of decomposing module and distributing module supported within the host CPU Program Space of the host computer system shown in FIG. 5A, wherein the decomposing module of present invention comprises functional sub-blocks for OS-GPU I/F and Utilities, Division Control and State Monitoring, and Composition Management, whereas the Distributing Module comprises functional sub-block for (Graphics Display List Data and Command) Distribution Management;

FIG. 6A is a schematic representation of the parallel graphics rendering process of the present invention having an object division mode, supported on the dual GPU-based parallel graphics system shown in FIG. 5A;

FIG. 6B is a graphical representation of Shader code (expressed in a graphics programming language, e.g. Cg) that is used within the primary GPU in order to carry out the pixel recomposition stage of the object division mode/method of the parallel graphics rendering process of the present invention, supported on the dual GPU-based parallel graphics system shown in FIG. 5A;

FIG. 7A is a schematic representation of an implementation of the multiple GPU-based parallel graphics system according to the present invention, constructed using a multiple GPU-based graphics cards;

FIG. 7B is a schematic representation of an implementation of the multiple GPU-based parallel graphics system according to the present invention, constructed using multiple GPUs on a single card.

Figure 7C:
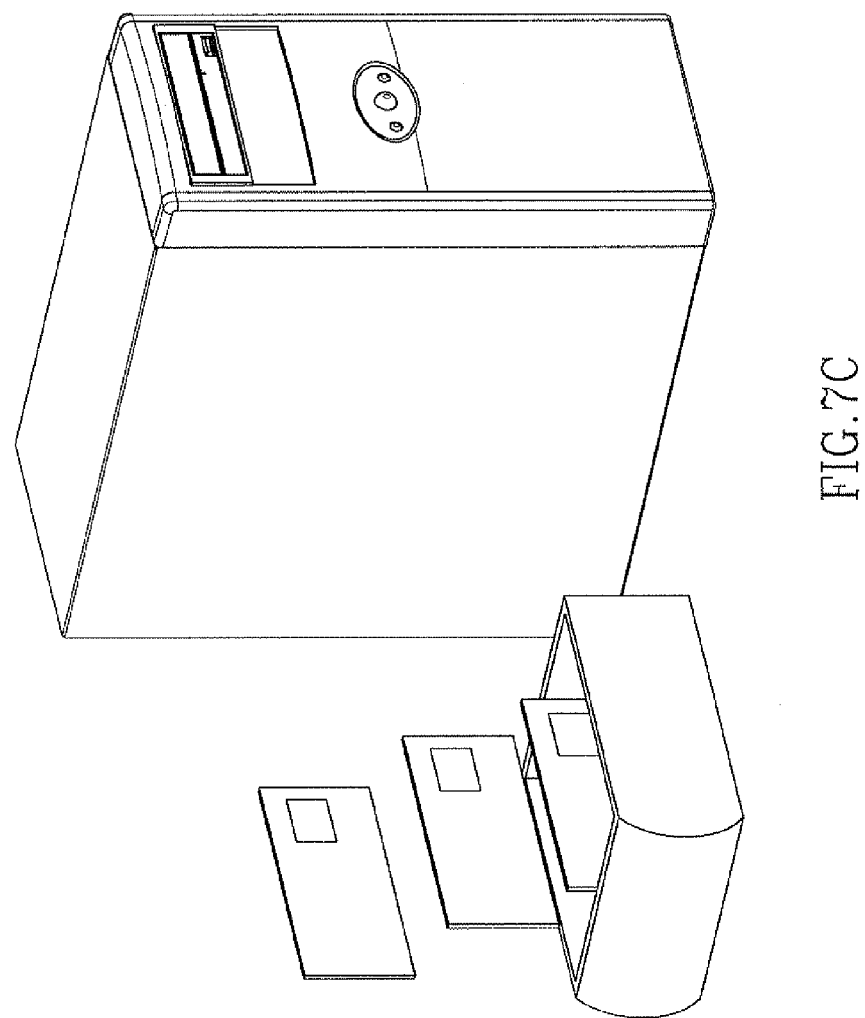
Figure 8:
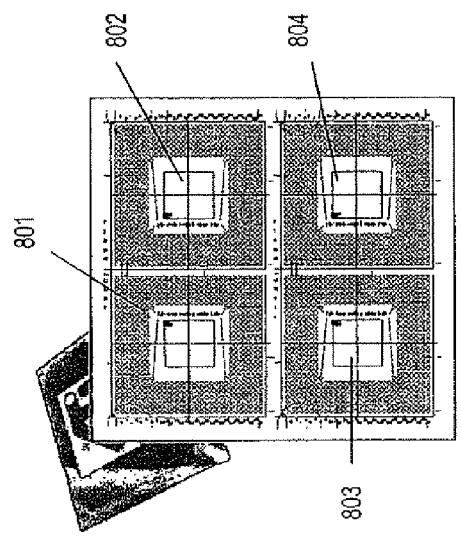
Figure 9C:
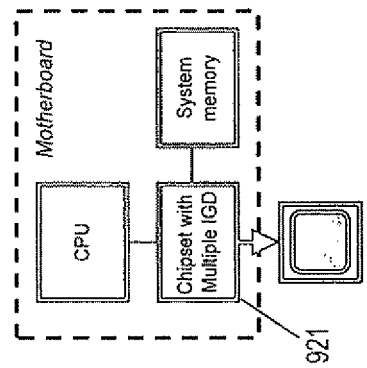
Figure 9B:
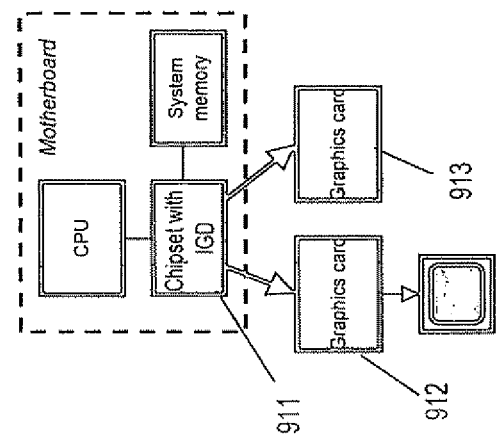
Figure 9A:
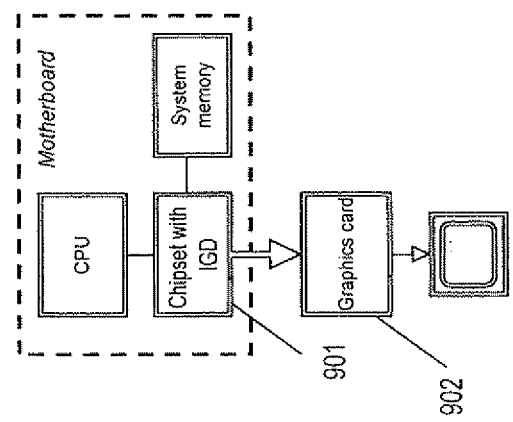
Figure 10:
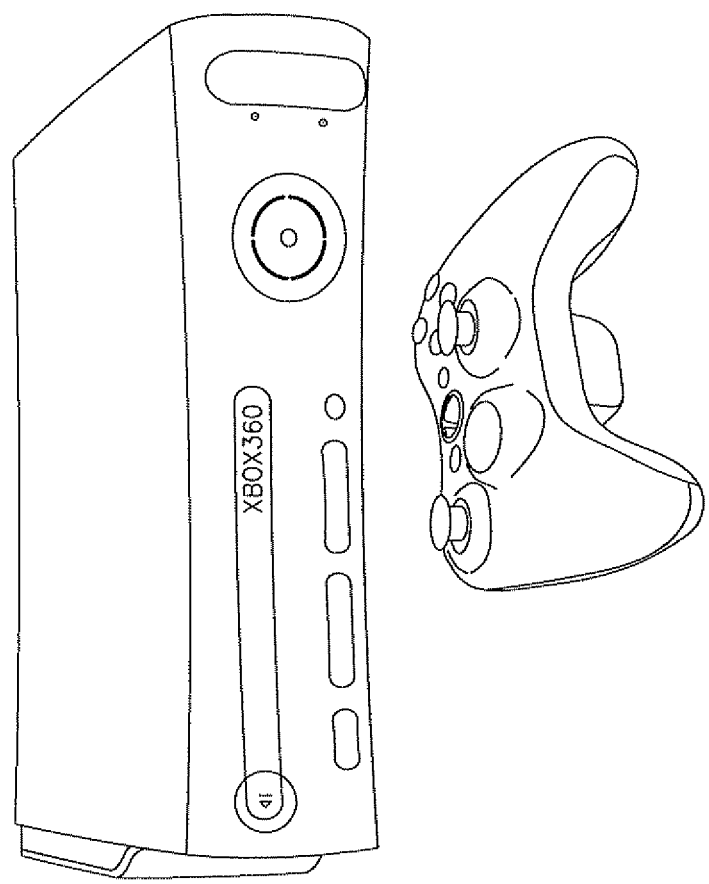

FIG. 7C is a schematic representation of an implementation of the multiple GPU-based parallel graphics system according to the present invention, constructed using an external box equipped with multiple GPU-based graphics cards;

FIG. 8 is a schematic representation of an implementation of the multiple GPU-based parallel graphics system according to the present invention, constructed using a multiple-GPU chip design;

FIG. 9A is a schematic representation of an implementation of the multiple GPU-based parallel graphics system according to the present invention, constructed as an integrated graphics device (IGD) based system provided with a single graphics card;

FIG. 9B is a schematic representation of an implementation of the multiple GPU-based parallel graphics system according to the present invention, constructed as a combined system comprising an IGD-based system provided with two graphics cards;

FIG. 9C is a schematic representation of an implementation of the multiple GPU-based parallel graphics system according to the present invention, constructed as a system having dual or multiple IGDs each embodying the object division based parallel graphics rendering process of the present invention; and FIG. 10 is a graphical representation of an implementation of the multiple GPU-based parallel graphics system of the present invention, wherein the multiple GPU-based parallel graphics system and process are incorporated within a video game console.

DETAILED DESCRIPTION OF THE ILLUSTRATIVE EMBODIMENTS OF THE PRESENT INVENTION

Referring to the FIGS. 4A through 10 in the accompanying Drawings, the various illustrative embodiments of the multiple GPU-based parallel graphics system and process of the present invention will be described in great detail, wherein like elements will be indicated using like reference numerals.

In accordance with the principles of the present invention, the pixel recomposition phase of the object division based graphics rendering process is carried out by means of GPU-based pixel processing resources including video memory, and the geometry processing subsystem and/or the pixel processing subsystem, as emphasized in FIG. 4A.

FIG. 4B illustrates the give major steps associated with the object division based parallel graphics rendering process of present invention, namely: decompose, distribute, render, recompose, and display. As illustrated in FIG. 4B, the computational resources contained within one of the multiple GPUs on the platform, termed the primary GPU, and to which the display device (406) is attached, are reutilized for image/pixel recomposing, in addition to graphics rendering. In FIG. 5B, the general case of a multiple GPU-based graphic subsystem is considered with n GPUs being shown. Pixel data contained in the Frame buffers (FB) associated with the secondary GPUs are moved to the primary GPU by way of an inter-GPU communication process (e.g. supported by multiple-lane PCI Express™ buses), and processed within the local FB of the primary GPU, to perform pixel image (re)composition, as will be explained in greater detail hereinafter. The pixel composition result is then sent to display device, and alternatively, also returned to the secondary GPUs, if required in some applications as a basis of the next pixel frame.

FIG. 4C illustrates the time-line of one complete composited pixel frame, including time slots associated with the different steps of object division rendering. The reuse of GPU resources for compositing not only eliminates the use of an additional specialized apparatus, but it is utilized in a time slot, where in prior art the specialized apparatus works, leaving the GPU resources idle during the recompose step. Thus, by virtue of the present invention, GPU resources are used "for free" without sacrificing system performance.

FIG. 5A shows an illustrative example of a dual GPU-based graphics system of present invention supporting object division mode of parallel graphics rendering employing GPU-based pixel recomposition. In the illustrative embodiment, the object division based GPU graphics system of the present invention is implemented using a conventional dual-GPU graphics platform (e.g. Nvidia's SLI™ dual-GPU graphics system system) supporting image or/and time division modes of parallel graphics rendering, and converting into the novel object division based GPU-based parallel graphics system of the present invention. This graphics platform conversion process, which is only one aspect of the present invention, is carried out using the novel software architecture and programming principles of the present invention (503), which in combination transforms a multiple GPU-based graphics platform (capable of supporting time and/or image division mode of parallel graphics rendering), by controlling the primary GPU (on the primary graphics card (205)) in such as way that it operates and supports pixel and other data processing operations that implement compositing stage of the object division based parallel graphics rendering process of the present invention.

As shown in FIG. 5A, decomposition is accomplished by Decomposing module (504), and the distribution of graphics display list data and command streams by Distributing module (505). Typically, the graphics support environment on the host computer comprises: the application (501); the Standard Graphics Library (502, e.g. OpenGL or Direct3D); and the vendor's GPU driver (506). In the illustrative embodiment of the system, there are two graphic cards (204, 205) driven by vendor's GPU driver, attached to the PC motherboard, and connected by two PCIexpress buses (207, 208) via memory bridge (203) (termed also "chipset"). One of these cards (205) is attached to display device (106) and is therefore termed the "primary" card, and its GPU, is termed the "primary GPU". The primary card is magnified so as show its internal architecture, which was described in part with reference to FIG. 2B.

As shown in FIG. 5B, the decomposing and distributing modules of present invention comprises a number of functional sub-blocks, namely: Decomposing module (504); OS-GPU Interface and Utilities (521); Division Control and State Monitoring (522); Composition Management (523); Distribution Management module (525).

The Decomposing module (504) primarily implements the decomposing step of object division rendering process, but also interfaces with the OS and vendor's GPU driver and with GPUs, and supervises recomposition process in GPUs. These steps are accomplished by means of the following functional blocks: OS-GPU Interface and Utilities (521); Division Control and State Monitoring (522); and Composition Management (523).

OS-GPU Interface and Utilities Module (521) performs all the functions associated with interaction with the Operation System, graphic library (e.g. OpenGL or DirectX), and interfacing with GPUs. This functional block is responsible for interception of the graphic commands from the standard graphic library, forwarding and creating graphic commands to Vendor's GPU Driver, controlling registry and installation, OS services and utilities.

Division Control and State Monitoring Module (522) controls the object division parameters and data to be processed by each GPU for load balancing, data validity, etc., and also handles state validity across the system. The graphic libraries (e.g. OpenGL and DirectX) are state machines. Parallelization must preserve cohesive state across the graphic system. It is done by continuous analysis of all incoming commands, while the state commands and some of the data must be duplicated to all pipelines in order to preserve the valid state across the graphic pipeline. This function is exercised mainly in object division scheme, as disclosed in detail in inventor's previous pending patent PCT/IL04/001069, incorporated herein by reference.

Composition Management Module (523) supervises the composition process at GPUs issuing commands and shader codes to handling the read-back of frame buffers, transfer data and perform compositing, as will be described in details hereinafter.

The Distributing Step/Phase (505) of object division parallel graphics rendering process of the present invention is implemented by the Distribution Management Module (525), which addresses the streams of commands and data to the different GPUs via chipset outputs.

Referring now to FIGS. 4A, 5A, 6A, and 6B, the innovative pixel compositing phase of the multiple-GPU based parallel graphics rendering process of the present invention will now be described in great technical detail. In one illustrative embodiment of the present invention, the compositing phase/stage involves moving the pixel Depth and Color values from the frame buffers FB in the secondary GPU, to the FB in the primary GPU (via inter-GPU communication), and merging then merging these pixel values with their counterparts at the primary GPU by means of programmable Fragment Shader in the pixel processing subsystem (211).

FIG. 6A provides a flowchart for the compositing process. In the illustrative embodiment, a compositing process employing dual GPUs is described. However, it is understood that if more GPUs are involved, then the flowchart process will repeat accordingly for each additional "secondary" GPU, until the final step when the partially composited pixel data in the frame buffer (FB) in the last secondary GPU, is finally composited with the pixel data within the frame buffer of the primary GPU.

As shown in FIG. 6A, the pixel frame generating pipeline includes the steps: decompose (402, see FIG. 4A)), distribute (403), and render (404). Towards the end of the graphics pipeline, the recompose step (405) is carried out for final FB, which is finally displayed to the display device (405).

During the Decompositing step (402), graphics commands and data stream are decomposed into well load balanced sub-streams in Decompositing Module (504, FIG. 5A), keeping state consistency of graphics libraries.

The Distributing step (403) is supervised by the Distributing module (505, FIG. 5A). They are sent to Vendor's GPU Driver (506), memory bridge (203), and delivered for rendering to graphics cards, the primary (205) and secondary (204) via separate PClexpress buses (207, 208).

Rendering (step 404) is done simultaneously (602, 603) in both GPUs, creating two partial FBs.

The compositing process (step 405 of FIG. 4) comprises the following substeps:

Step (606): The color FB is read back from the secondary GPU, and moved via memory bridge (203) to the primary GPU's Texture memory (218) as a texture tex1.

Step (607)L The Z-buff is read back from the secondary GPU, and moved via memory bridge (203) to the primary GPU's Texture memory (218) as a texture dep1.

Step (604): Color FB of primary GPU is copied to texture memory as texture tex2.

Step (605): Z-buffer of primary GPU is copied to texture memory as texture dep2.

Step (608): Shader code for recomposition (as shown in FIG. 6B) is downloaded and exercised on four textures tex1, tex2, dep1, dep2 as follows:

Step (609): The two depth textures are compared pixel by pixel for their depth values. Assuming the rule that the closest pixel is the one to be transferred to the final FB, at each x,y location the two depth textures are compared for lowest depth value, the lowest is chosen, and the color value at x,y of its correspondent color texture is moved to the x,y location in the final texture.

Step (610): The resulting texture is copied back to the primary color FB.

To complete rendering (step 404b), the following substeps are performed:

Step (611): All transparent objects of the scene and overlays (such as score titles) are essentially kept by applications for the very last data to be rendered. Therefore, once all opaque objects have been rendered in parallel at separate GPUs and composed back to the primary's FB, the additional and final phase of a non-parallel rendering of transparent objects takes place in the primary GPU.

Step (612): The final FB is sent to the display device for display on its display screen.

In step 405, the detailed shader program is used to composite two color textures based on depth test between two depth textures, as shown in FIG. 6B.

While the above illustrative embodiment discloses the use of the Fragment Shader in the pixel processing subsystem/engine within the primary GPU to carry out the composition process in the dual GPU-based graphics platform of the present invention, it is understood that other computational resources within the GPU can be used in accordance with the scope and spirit of the present invention. In particular, in a second illustrative embodiments, the compositing phase/stage can involve moving the pixel Depth and Color values from the frame buffers FB in the secondary GPU, to the FB in the primary GPU (via inter-GPU communication), and merging then merging these pixel values with their counterparts at the primary GPU by means of programmable Vertex Shader in the geometry processing subsystem (210). And in yet another illustrative embodiment of the present invention, the compositing phase/stage can involve moving the pixel Depth and Color values from the frame buffers FB in the secondary GPU, to the FB in the primary GPU (via inter-GPU communication), and merging then merging these pixel values with their counterparts at the primary GPU by means of both programmable Vertex and Fragment Shaders in the geometry and pixel processing subsystems in the primary GPU. Such modifications will become readily apparent to those skilled in the art having the benefit of the present inventive disclosure.

As taught hereinabove, the GPU-based composition process associated with the object division parallel graphics rendering process of the present invention can be realized as a software method that (i) controls the computational machinery within the GPUs of the parallel graphics platform, and (ii) exploits the Shader (pixel) processing capabilities in the primary GPU, with no need for any external hardware. As this GPU exists in any dual or multiple GPU-based graphics system, the object division parallel graphics rendering process and platform of present invention can be implemented on a great variety of existing, as well as new graphics systems in a multitude of ways. Below are just some examples of possible system designs that can be constructed using the principles of the present invention.

In FIG. 7A, there is shown a first implementation of the dual GPU-based parallel graphics system (700) according to the present invention, constructed using a multiple GPU-based graphics cards (701). In an illustrative embodiment, host motherboard can be realized as an Asus A8N-SLI (702), and the graphics cards can be realized by a pair of Nvidia GEforce 6800 cards (701) and chipset nForce 680 by Nvidia (not shown).

In FIG. 7B, there is shown an implementation of the multiple GPU-based parallel graphics system according to the present invention, constructed using multiple GPUs on a single card.

In FIG. 7C, there is shown a second implementation of the multiple GPU-based parallel graphics system according to the present invention, constructed using an external box equipped with multiple GPU-based graphics cards.

In FIG. 8, there is shown a third implementation of the multiple GPU-based parallel graphics system according to the present invention, constructed using a multiple-GPU chip design.

In FIG. 9, there is shown a fourth implementation of the multiple GPU-based parallel graphics system according to the present invention, constructed as an integrated graphics device (TGD) based system (901) provided with a single graphics card (902). As conventional IGD-based chipsets (e.g. Intel 845GL) do not have programmable shaders yet the external GPU on the graphics card will function as the primary GPU and perform the pixel composition process in accordance with the principles of the present invention.

In FIG. 9B, there is shown a fifth implementation of the multiple GPU-based parallel graphics system according to the present invention, constructed as a combined system comprising an IGD-based system (911) provided with two graphics cards (912, 913). In the illustrative embodiment, the IGD of this dual card system has dual PCIexpress bus (e.g. bearlake by Intel), so that two external GPUs can be used.

In FIG. 9C, there is show a sixth implementation of the multiple GPU-based parallel graphics system according to the present invention, constructed as a system having dual or multiple IGDs each embodying the object division based parallel graphics rendering process of the present invention. Such an IGD will include a programmable shader to practice the pixel composition process of the present invention.

In FIG. 10, there is shown a graphical representation of a seventh possible implementation of the multiple GPU-based parallel graphics system of the present invention, wherein the multiple GPU-based parallel graphics system and process are incorporated within a video game console. This illustrative example shows the Microsoft™ Xbox 360 game console embodying the parallel graphics rendering process and apparatus of the present invention.

While the illustrative embodiments of the present invention have been described in connection with various PC-based computing system applications, it is understood that that parallel graphics systems and rendering processes of the present invention can also be used in video game consoles and systems, mobile computing devices, e-commerce and POS displays and the like.

It is understood that the parallel graphics rendering technology employed in computer graphics systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A method of recompositing partial pixel data within a graphics processing unit (GPU) of a multi-GPU graphics processing subsystem so as to produce images for display on a screen,
   wherein said partial pixel data is generated by a plurality of GPUs operating according to an object division mode of graphics parallelization, wherein said object division mode includes a rendering phase of operation and a recomposition phase of operation, wherein each GPU has one or more programmable shaders, and a frame buffer (FB) having depth buffers for buffering pixel depth values and color frame buffers for buffering pixel color values, and wherein at least one of said GPUs is a display-designated GPU that is connectable to said screen for displaying images produced by said multi-GPU graphics processing subsystem, and at least one of said GPUs is a non-display-designated GPU, said method comprising the sequence of steps of:
   (a) entering said rendering phase, and programming and configuring said one or more programmable shaders within said display designated GPU and said one or more non-display-designated GPUs, to perform rendering operations that produce partial results;
   (b) passing geometric data and commands to said plurality of GPUs according to said object division mode of parallelization;
   (c) using said one or more programmable shaders within said display designated GPO and said one or more non-display-designated GPUs, to generate partial results for said depth and color frame buffers according to said object division mode; and
   (d) exiting said rendering phase, and entering said recomposition phase, and reprogramming and reconfiguring said one or more programmable shaders within said display designated GPU, to perform recomposition operations that produce an image for display;
   (e) moving said partial results to said display-designated GPU;
   (f) using said one or more programmable shaders within said display-designated GPU to produce an image for display; and
   (g) displaying said image on said screen.

2. The method of claim 1, said one or more programmable shaders comprises programmable fragment shaders.

3. The method of claim 1, said one or more programmable shaders comprises programmable vertex shaders.

4. The method of claim 2, further comprising the recomposition steps of said programmable shaders in the said display-designated GPU,
   (i) comparing, on a pixel-by-pixel basis, the pixel depth (z) values of opaque rendered objects buffered in said depth buffers, and representative of partial results, and
   (ii) at each x,y location in said color frame buffer of said display-designated GPU, selecting the pixel having the lowest depth value representative of the pixel closet to the viewer along a viewing direction, and
   (iii) moving the associated color value of the selected pixel to the corresponding x.y location in said color frame buffer of said display-designated GPU, for composition with other selected pixels, so as to produce an image for subsequent display.

5. A multi-GPU graphics processing subsystem for use in a computing system, said graphics processing subsystem comprising:
   a plurality of GPUs operating according to object division mode of graphics parallelization,
   wherein said object division mode includes a rendering phase of operation and a recomposition phase of operation;
   wherein at least one of said GPUs is a display-designated GPU that is connectable to a screen for displaying images produced by said multi-GPU graphics processing subsystem, and at least one of said GPUs is a non-display-designated GPU;
   wherein each said GPU includes (i) one or more programmable shaders, and (ii) video memory including a frame buffer (FB) having depth buffers for buffering pixel depth values and color frame buffers for buffering pixel color values; and
   wherein for images to be generated and displayed on said screen, geometric data and graphics commands are distributed to said plurality of GPUs according to said object division mode of parallelization, wherein the multi-GPU graphics processing subsystem supports the following data processing steps:
   (a) upon entering said rendering phase, programming and configuring said one or more programmable shaders within said display designated GPU and said one or more non-display-designated GPUs, to perform rendering operations that produce partial results;
   (b) passing geometric data and commands to said plurality of GPUs according to said object division mode of parallelization;
   (c) using said one or more programmable shaders within said display designated GPU and said one or more non-display-designated GPUs, to generate partial results for depth and color frame buffers according to the object division mode of parallelization;
   (d) exiting said rendering phase, and entering said recomposition phase, and reprogramming and reconfiguring said one or more programmable shaders within said display designated GPU, to perform recomposition operations that produce an image for display; and (e) displaying said image on said screen.

6. The subsystem of claim 5, wherein said one or more programmable shaders comprise programmable fragment shaders.

7. The subsystem of claim 5, wherein said one or more programmable shaders comprise programmable vertex shaders.

8. The subsystem of claim 5, wherein said programmable shaders in said display-designated GPU, perform the following operations within said display-designated GPU:

(i) comparing, on a pixel-by-pixel basis, the pixel depth (z) values of opaque rendered objects, (ii) at each x,y location, selecting the pixel having the lowest depth value representative of the pixel closet to the viewer along said viewing direction, (iii) moving the associated color value of the selected pixel to the corresponding x,y location in said color frame buffer, for composition with other selected pixels to produce an image for subsequent display; and (iv) displaying said image pixel data on said screen.

\* \* \* \* \*